United States Patent
Coleman et al.

(10) Patent No.: US 7,198,024 B2
(45) Date of Patent: Apr. 3, 2007

(54) LOW EMISSIONS COMPRESSION IGNITED ENGINE TECHNOLOGY

(75) Inventors: Gerald N. Coleman, Dunlap, IL (US); Jonathan P. Kilkenny, Peoria, IL (US); Eric C. Fluga, Dunlap, IL (US); Kevin P. Duffy, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/333,391

(22) Filed: Jan. 17, 2006

(65) Prior Publication Data

US 2006/0112928 A1 Jun. 1, 2006

Related U.S. Application Data

(62) Division of application No. 10/653,507, filed on Sep. 2, 2003, now abandoned.

(60) Provisional application No. 60/434,015, filed on Dec. 17, 2002.

(51) Int. Cl.
*F02B 1/14* (2006.01)
(52) U.S. Cl. ............... 123/305; 123/568.11; 123/562
(58) Field of Classification Search ............... 123/294, 123/305, 568.11, 562
See application file for complete search history.

(56) References Cited

U.S. PATENT DOCUMENTS

| | | | |
|---|---|---|---|
| 4,768,481 A | 9/1988 | Wood | |
| 5,058,549 A | 10/1991 | Hashimoto et al. | |
| 5,458,292 A | 10/1995 | Hapeman | |
| 5,476,072 A | 12/1995 | Guy | |
| 5,743,243 A | 4/1998 | Yanagihara | |
| 5,829,250 A | 11/1998 | Lane et al. | |
| 5,832,880 A | 11/1998 | Dickey | |
| 5,875,743 A | 3/1999 | Dickey | |
| 5,899,389 A | 5/1999 | Pataki et al. | |
| 5,996,558 A | 12/1999 | Ouellette et al. | |
| 6,067,973 A | 5/2000 | Chanda et al. | |
| 6,286,482 B1 | 9/2001 | Flynn et al. | |
| 6,289,666 B1 | 9/2001 | Ginter | |
| 6,289,884 B1 | 9/2001 | Blandino et al. | |
| 6,443,104 B1 | 9/2002 | Simescu et al. | |
| 6,460,491 B1 | 10/2002 | Stanglmaier et al. | |
| 6,467,257 B1 | 10/2002 | Khair et al. | |
| 6,470,864 B2 * | 10/2002 | Kim et al. .............. | 123/568.12 |
| 6,474,323 B1 | 11/2002 | Beck et al. | |
| 6,561,157 B2 | 5/2003 | Zur Loye et al. | |
| 6,659,071 B2 | 12/2003 | LaPointe et al. | |
| 6,701,886 B2 | 3/2004 | Walter et al. | |
| 6,725,838 B2 | 4/2004 | Shafer et al. | |

OTHER PUBLICATIONS

U.S. Appl. No. 10/122,560, filed Apr. 15, 2002, Faletti et al.
Ignition Timing Control At Toyota "Unibus" Combustion System by Hiromichi Yanagihara.
New Diesel Combustion Process To Achieve Near Zero NOx and Particulate Emissions, By Bertrand Gatellier, Burno Walter.

* cited by examiner

*Primary Examiner*—Erick Solis
(74) *Attorney, Agent, or Firm*—Liell & McNeil

(57) ABSTRACT

A method and apparatus for operating a compression ignition engine having a cylinder wall, a piston, and a head defining a combustion chamber. The method and apparatus includes delivering fuel substantially uniformly into the combustion chamber, the fuel being dispersed throughout the combustion chamber and spaced from the cylinder wall, delivering an oxidant into the combustion chamber sufficient to support combustion at a first predetermined combustion duration, and delivering a diluent into the combustion chamber sufficient to change the first predetermined combustion duration to a second predetermined combustion duration different from the first predetermined combustion duration.

5 Claims, 19 Drawing Sheets

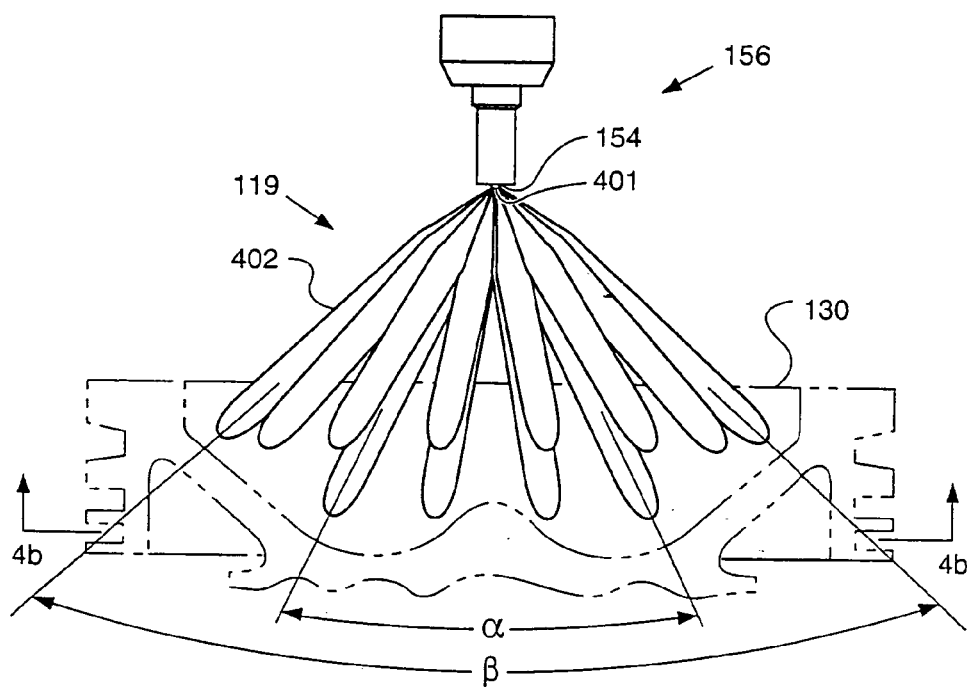
Fig_4a_
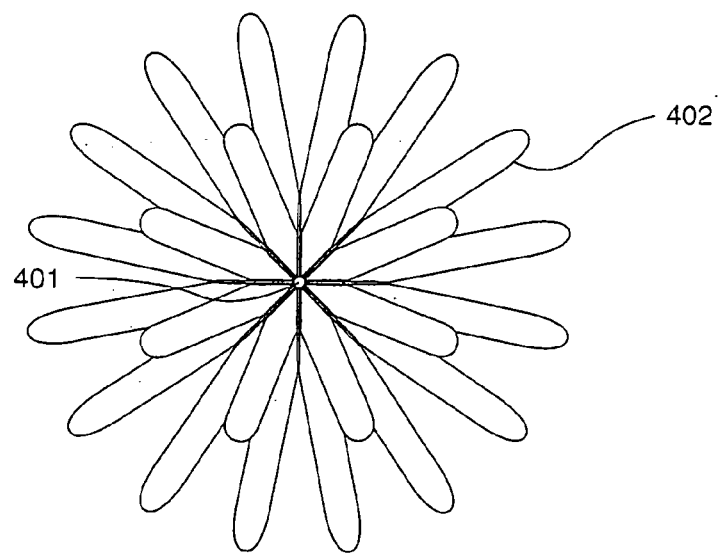
Fig_4b_

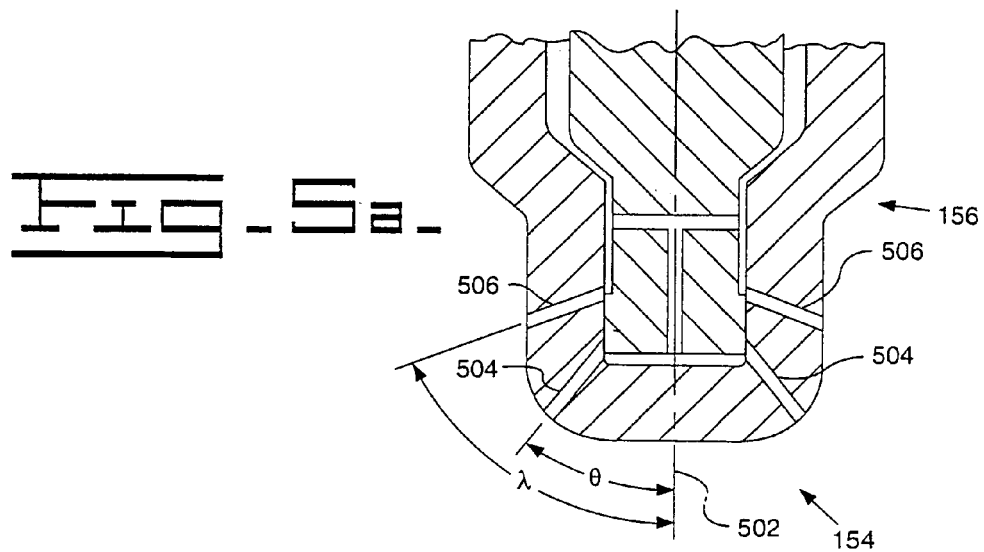
Fig_5a_
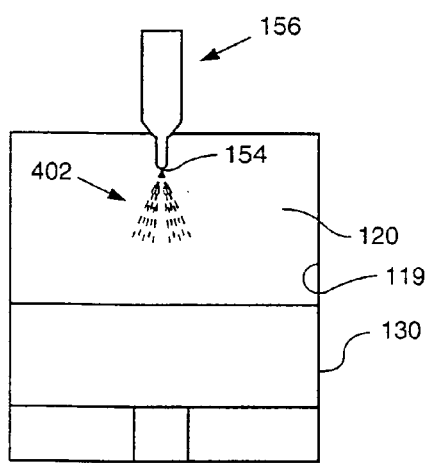
Fig_5b_
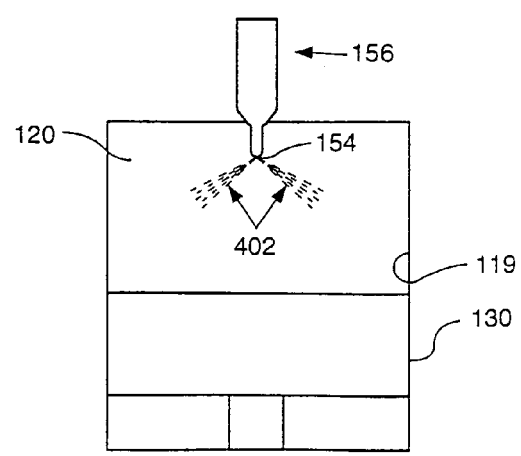
Fig_5c_

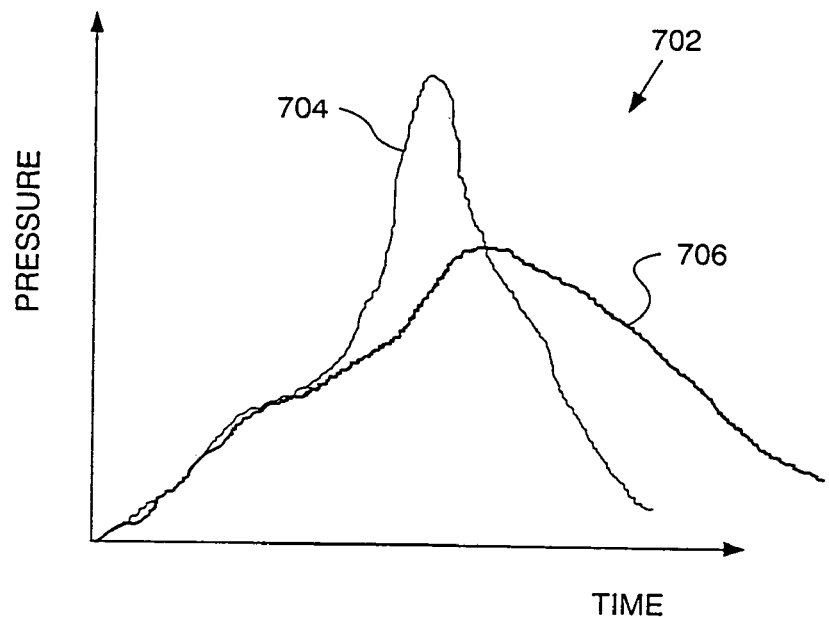
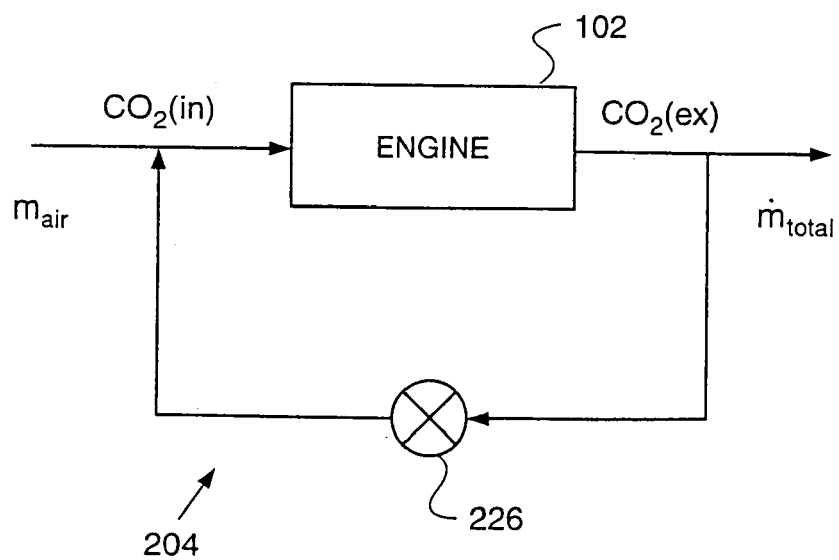

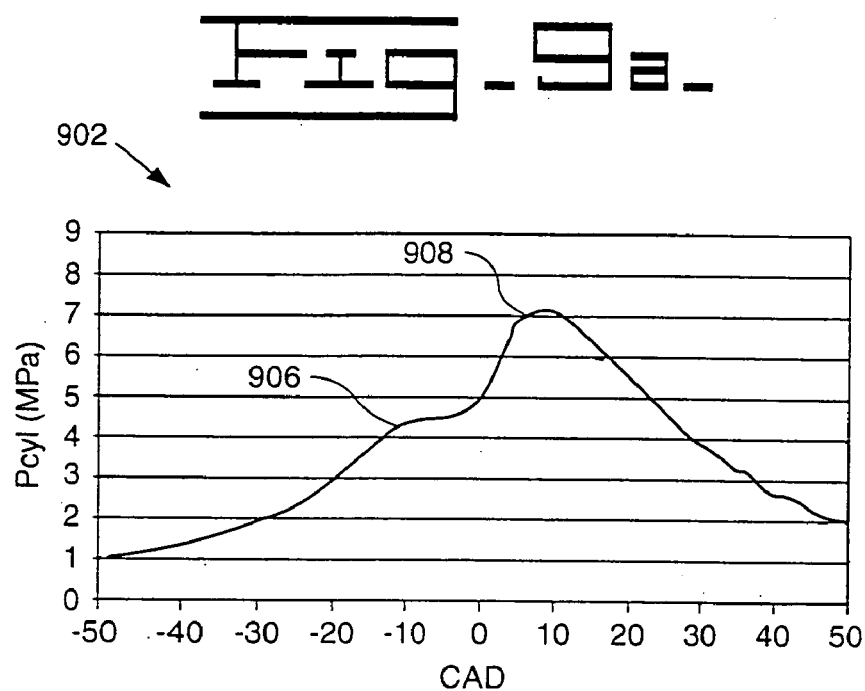
Fig-9a-
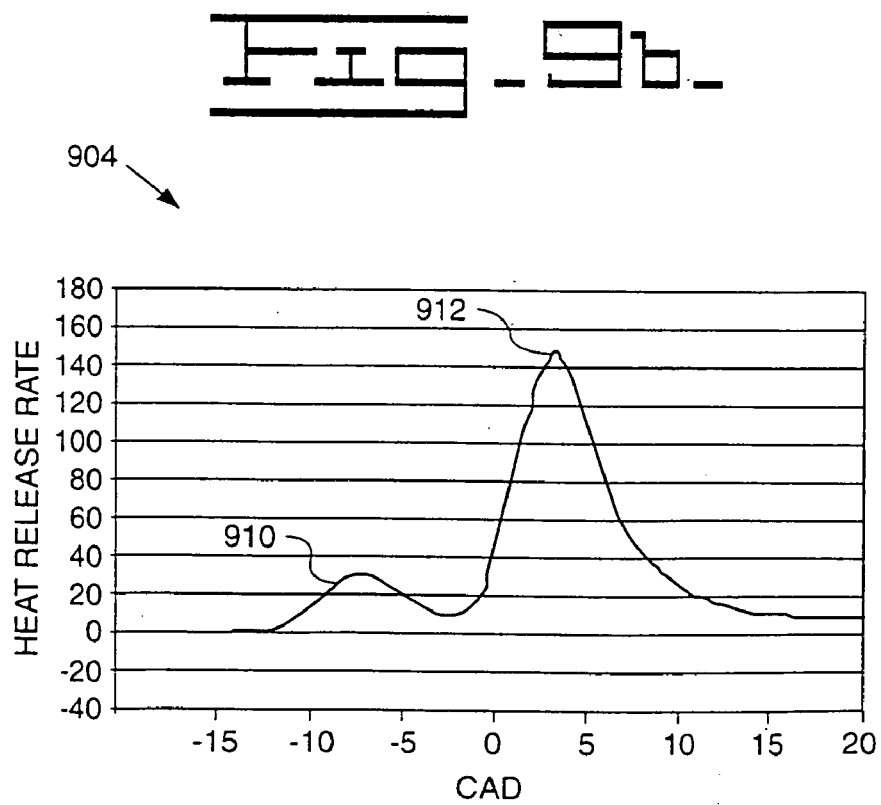
Fig-9b-

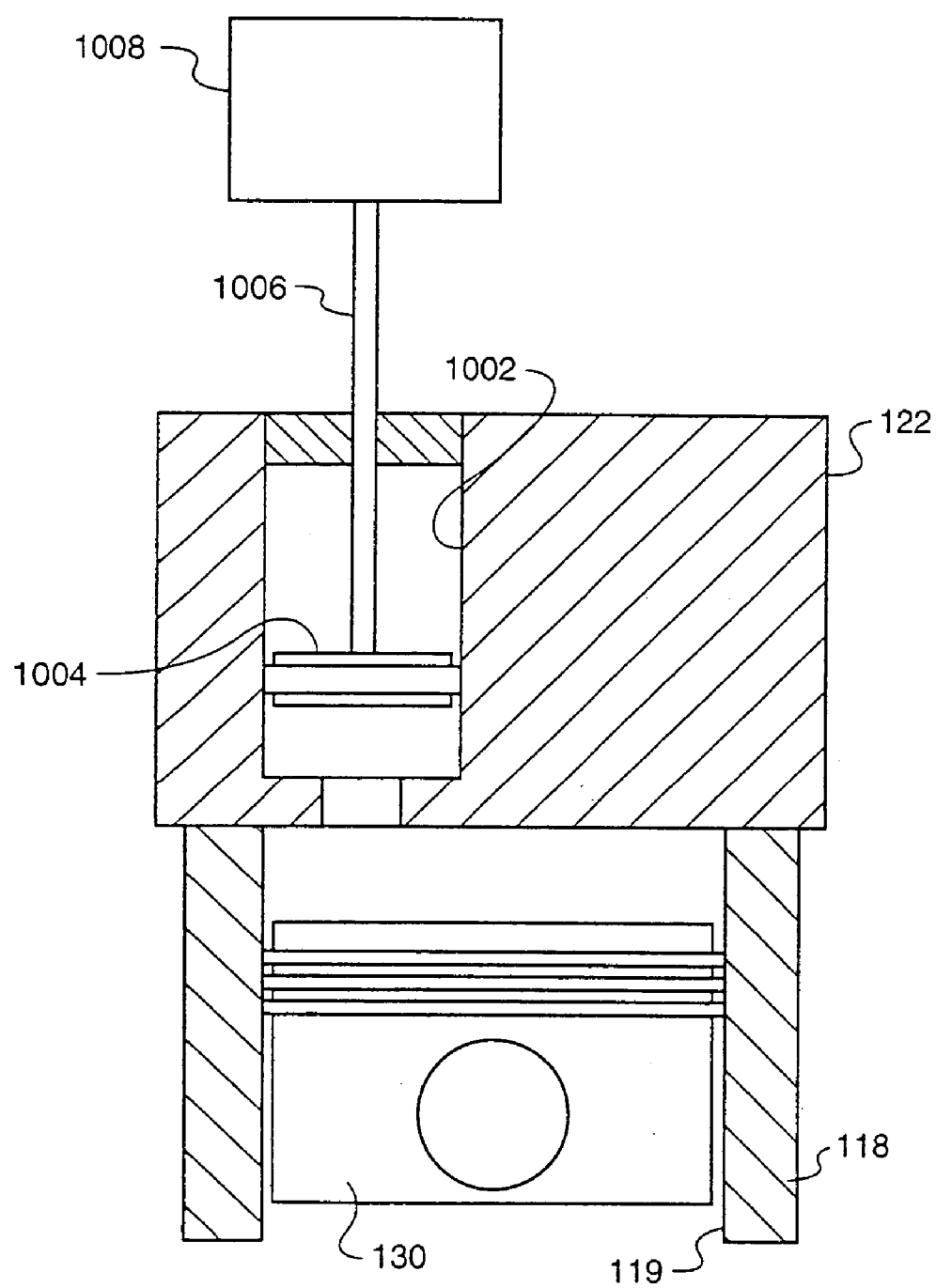
Fig_10_

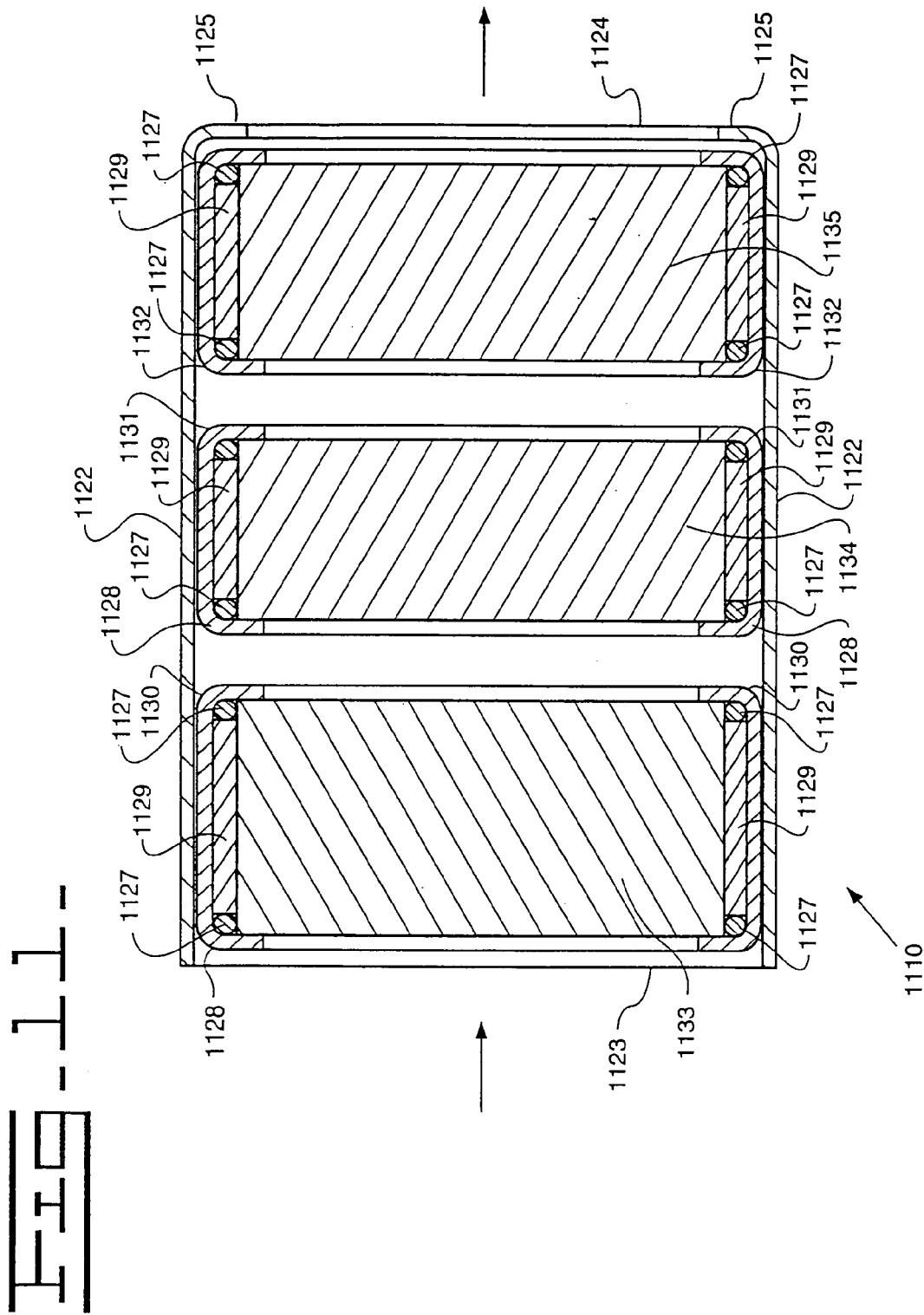

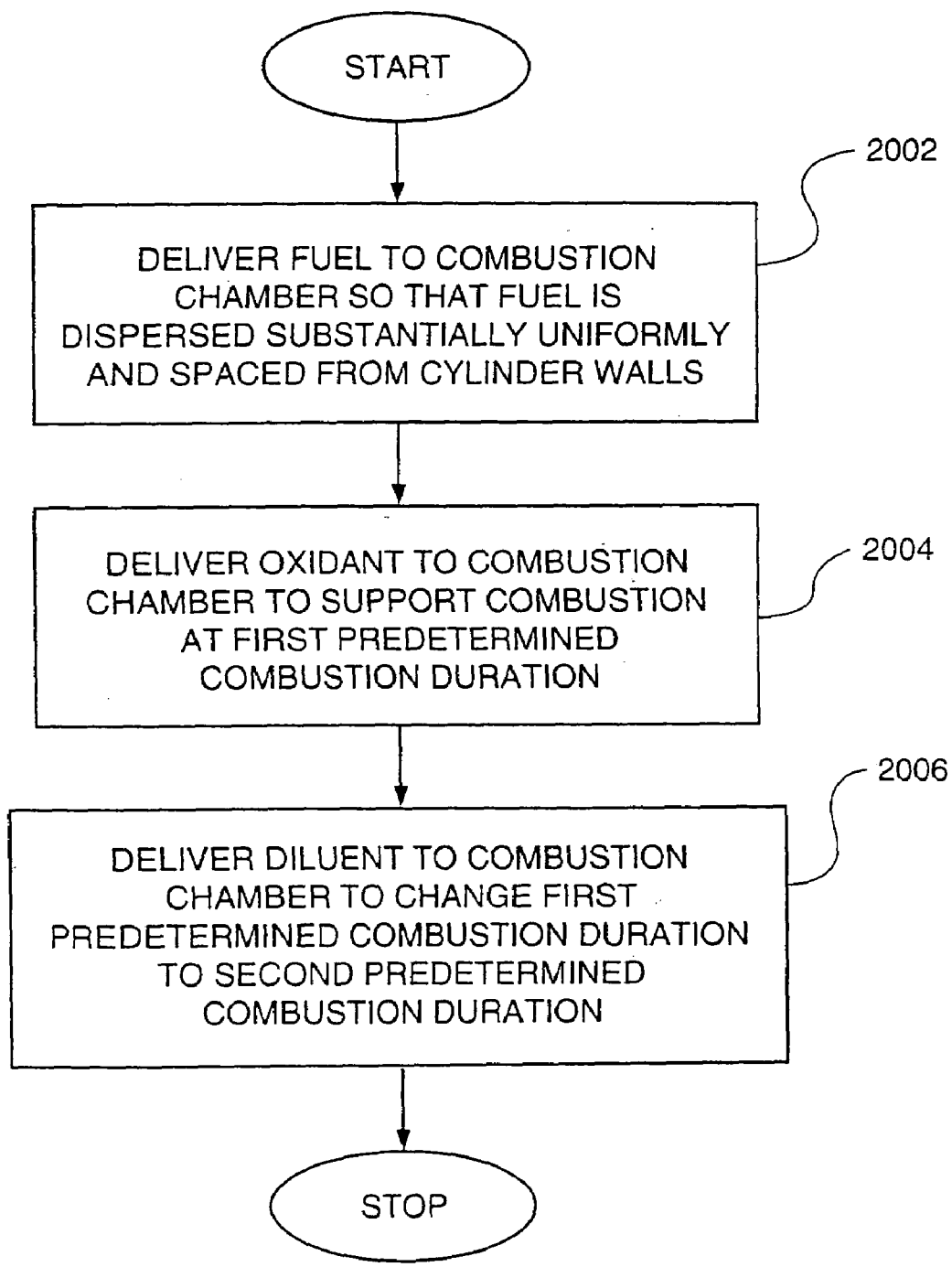

LOW EMISSIONS COMPRESSION IGNITED ENGINE TECHNOLOGY

RELATION TO OTHER PATENT APPLICATIONS

This application is a divisional of Ser. No. 10/653,507, filed Sep. 2, 2003 now abandoned, which claimed the benefit of provisional application Ser. No. 60/434,015 filed Dec. 17, 2002.

U.S. GOVERNMENT RIGHTS

The U.S. Government has rights in the invention pursuant to Department of Energy Contract No. DEFC 05-970R22605.

TECHNICAL FIELD

This invention relates generally to a method and apparatus for operating a compression ignition engine and, more particularly, to a method and apparatus for operating an engine in a homogeneous charge compression ignition mode to achieve low emissions during normal operating load conditions.

BACKGROUND

Internal combustion engines are used extensively for a variety of purposes. The transportation infrastructure relies almost exclusively on the use of engines to provide power for mobility. Electrical power generation also relies heavily on internal combustion engines.

The prolific use of engines in our society has created a number of issues, one of which is the ever-increasing amounts of combustion by-products being emitted. Although today's engines operate with much lower emission levels than previous generations of engines, the rapidly increasing numbers of engines being used creates the need to reduce emission levels even more.

Governments around the world recognize this problem and are taking regulatory steps to address the emission levels of engines. For example, levels of oxides of nitrogen (NOx), hydrocarbons (HC), carbon monoxide (CO), and smoke, among others, must be reduced drastically to meet evolving government standards.

Spark ignition engines, by the nature of their operation and the types of fuel used, tend to produce low levels of NOx and particulate emissions. Compression ignition engines, for example diesel engines, generally produce high levels of NOx and particulate emissions. Diesel engines, however, are still popular in use because they provide higher thermal efficiency than their spark-ignition counterparts, and thus offer higher power output for work applications.

Engines that operate in homogeneous charge compression ignition (HCCI) mode have generated much interest due to the potential to operate at high fuel efficiency while generating low combustion emissions. HCCI engines differ from conventional diesel compression ignition engines in that diesel engines ignite fuel that is rich, i.e., highly concentrated in an area in a combustion chamber, while HCCI techniques create a dispersed homogeneous fuel/air mixture by the time of combustion. Combustion of a homogeneous fuel/air mixture allows an engine to operate such that emission by-products are significantly reduced.

The theory of HCCI mode operation has not been met by the reality, however. It has proven to be extremely difficult to create a desired homogeneous mixture of fuel and air and still control operation of the engine. For example, it is very difficult to control the timing of combustion when introducing a homogeneous mixture into a combustion chamber. Past attempts by others has only resulted in partial success under low load, e.g., one half load or less, conditions. In U.S. Pat. No. 6,286,482, Flynn et al. recognize this issue and only operate an engine in PCCI mode (which is equivalent to HCCI) under low to medium load conditions. Operation switches to spark ignition mode at high loads. Yanagihara, in a paper entitled "Ignition Timing Control at Toyota 'UNI-BUS' Combustion System", limits engine operation to one half load to enable operation in HCCI mode.

The present invention is directed to overcoming one or more of the problems as set forth above.

SUMMARY OF THE INVENTION

In one aspect of the present invention a method for operating a compression ignition engine having a cylinder wall, a piston, and a head defining a combustion chamber is disclosed. The method includes the steps of delivering fuel substantially uniformly into the combustion chamber, the fuel being dispersed throughout the combustion chamber and spaced from the cylinder wall, delivering an oxidant into the combustion chamber sufficient to support combustion at a first predetermined combustion duration, and delivering a diluent into the combustion chamber sufficient to change the first predetermined combustion duration to a second predetermined combustion duration different from the first predetermined combustion duration.

In another aspect of the present invention a method for operating a compression ignition engine having a cylinder wall, a piston, and a head defining a combustion chamber is disclosed. The method includes the steps of delivering fuel substantially uniformly into the combustion chamber, the fuel being dispersed throughout the combustion chamber and spaced from the cylinder wall, delivering an oxidant into the combustion chamber sufficient to support combustion at a first predetermined pressure rise rate, and delivering a diluent into the combustion chamber sufficient to change the first predetermined pressure rise rate to a second predetermined pressure rise rate different from the first predetermined pressure rise rate.

In yet another aspect of the present invention a method for delivering fuel into a combustion chamber of a compression ignition engine, the combustion chamber being defined by a cylinder wall, a piston, and a head, is disclosed. The method includes the steps of delivering the fuel to a nozzle of an injector, the nozzle having a plurality of holes distributed in a desired pattern, and injecting the fuel through the nozzle holes into the combustion chamber in a predetermined spray pattern so that the fuel is dispersed throughout the combustion chamber and spaced from the cylinder wall.

In still another aspect of the present invention an apparatus for operating a compression ignition engine having a cylinder wall, a piston, and a head defining a combustion chamber is disclosed. The apparatus includes a fuel injector having a nozzle positioned to inject fuel in a dispersed pattern throughout the combustion chamber and spaced from the cylinder wall, and an air supply system for delivering at least one of an oxidant and a diluent into the combustion chamber.

BRIEF DESCRIPTION OF THE DRAWINGS

FIG. 4a is a diagrammatic illustration of a fuel spray pattern;

FIG. 4b is another view of the fuel spray pattern of FIG. 4a;

FIG. 5a is a partial view of an exemplary fuel injector tip;

FIG. 5b is a diagram illustrating use of the fuel injector tip of FIG. 5a in a first mode;

FIG. 5c is a diagram illustrating use of the fuel injector tip of FIG. 5a in a second mode;

FIG. 7 is a graph depicting a combustion event as a function of pressure and time;

FIG. 8 is a block diagram illustrating exhaust gases being routed from the output of an engine to the input of the engine;

FIG. 9a is a graph depicting a combustion event as a function of cylinder pressure and crank angle degrees;

FIG. 9b is a graph depicting a combustion event as a function of a heat release rate and crank angle degrees;

FIG. 10 is a diagrammatic illustration of an exemplary variable compression ratio configuration;

FIG. 11 is a diagrammatic illustration of an exemplary 3-way catalyst;

FIG. 20 is a flow diagram illustrating a preferred method of the present invention.

DETAILED DESCRIPTION

Figure 1:
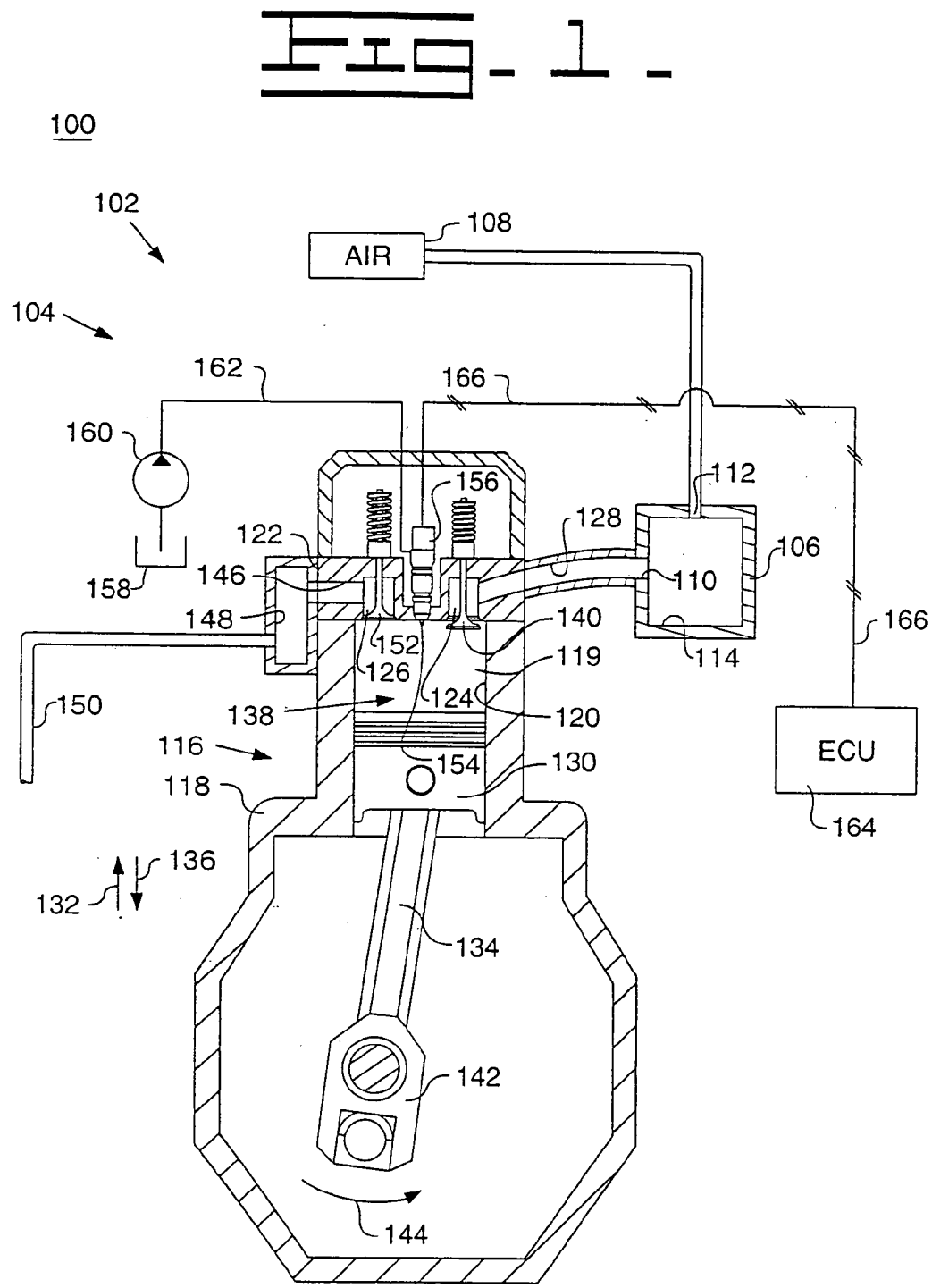
FIG. 1 is a diagrammatic illustration of an internal combustion engine suited for use with the present invention.

Referring to the drawings and the specification, a method and apparatus 100 for operating a compression ignition engine 102 is disclosed.

Referring to FIG. 1, there is shown an engine assembly 104. The engine assembly 104 depicts fundamental operation of a compression ignition engine 102. Additional features of the engine assembly 104 of FIG. 1, for example an exhaust gas recirculation assembly, are described below with reference to additional figures.

The engine assembly 104 includes a plenum member 106, and an air source 108. The plenum member 106 has an inlet opening 112, and an exit opening 110 defined therein. The air source 108 supplies air to the inlet opening 112. Air from the air source 108 advances into a plenum chamber 114 defined in the plenum member 106 via the inlet opening 112. It is noted that the description pertaining to FIG. 1 refers to air as being the medium being provided to the engine assembly 104. However, as described below, any suitable fluid medium may be used, for example, recirculated exhaust gases combined with air, and the like.

The engine assembly 104 further includes a cylinder assembly 116. The cylinder assembly 116 includes a block 118 having a cylinder 119 defined therein. The cylinder 119 is defined by a cylinder wall 120. An engine head 122 is secured to the block 118. The engine head 122 has an intake port 124, an exhaust port 126, and a fuel injector opening 154 defined therein. An intake conduit 128 places the intake port 124 in fluid communication with the exit opening 110 of the plenum member 106. An exhaust passage 146 places the exhaust port 126 in fluid communication with an exhaust manifold 148.

The engine assembly 104 further includes a piston 130 which translates in the cylinder 119 in the general direction of arrows 132 and 136. As the piston 130 moves downwardly in the general direction of arrow 136 to the position shown in FIG. 1, a connecting rod 134 urges a crankshaft 142 to rotate in the general direction of arrow 144. Subsequently, as the crankshaft 142 continues to rotate in the general direction of arrow 144, the crankshaft 142 urges the connecting rod 134 and the piston 130 in the general direction of arrow 132 to return the piston 130 to the uppermost position (not shown).

The piston 130, the cylinder wall 120, and the engine head 122 cooperate so as to define a combustion chamber 138. In particular, when the piston 130 is advanced in the general direction of arrow 132, the volume of the combustion chamber 138 is decreased. On the other hand, when the piston 130 is advanced in the general direction of arrow 136, the volume of the combustion chamber 138 is increased as shown in FIG. 1.

The engine assembly 104 further includes a fuel reservoir 158. A fuel pump 160 draws low pressure fuel from the fuel reservoir 158 and advances high pressure fuel to a fuel injector 156 via a fuel line 162. The fuel injector 156 is positioned in the injector opening 154 and is operable to inject a quantity of fuel into the combustion chamber 138 through the injector opening 154. In particular, the fuel injector 156 injects fuel into the combustion chamber 138 upon receipt of an injector control signal on a signal line 166. Furthermore, the fuel can be any one of the following group of fuels: diesel fuel, crude oil, lubricating oil, or an emulsion of water and diesel fuel. More generally, the fuel may be any type of fuel which has a high cetane number, thus having the property of combusting readily.

It should be appreciated that the amount of fuel injected by the fuel injector 156 controls the ratio of air to fuel, or air/fuel ratio, advanced to the combustion chamber 138. Specifically, if it is desired to advance a leaner mixture to the combustion chamber 138, a fuel control signal received via signal line 166 causes the fuel injector 156 to operate so as to inject less fuel to the combustion chamber 138. On the other hand, if it is desired to advance a richer mixture of air and fuel to the combustion chamber 138, a fuel control signal received via signal line 166 causes the fuel injector 156 to operate so as to advance more fuel to the combustion chamber 138.

It is noted that other methods of introducing the fuel and air mixture to the combustion chamber 138 may be used without deviating from the spirit and scope of the present invention. For example, the fuel may be mixed with air at any point from the air source 108 through the intake conduit 128, including upstream of a turbocharger (not shown).

An intake valve 140 selectively places the plenum chamber 114 in fluid communication with the combustion chamber 138. The intake valve 140 may be actuated in a known manner by a camshaft (not shown), a pushrod (not shown), and a rocker arm (not shown) driven by rotation of the crankshaft 142. Alternatively, the intake valve 140 may be actuated by other means, such as hydraulically, electronically, a combination of electro-hydraulically, and the like. When the intake valve 140 is placed in the open position (shown in FIG. 1), air is advanced from the intake conduit 128 to the combustion chamber 138 via the intake port 124. When the intake valve 140 is placed in the closed position (not shown), air is prevented from advancing from the intake conduit 128 to the combustion chamber 138 since the intake valve 140 blocks fluid flow through the intake port 124.

An exhaust valve 152 selectively places the exhaust manifold 148 in fluid communication with the combustion chamber 138. The exhaust valve 152 may be actuated in a known manner by a camshaft (not shown), a pushrod (not shown), and a rocker arm (not shown) each of which are driven by the rotation of the crankshaft 142. Alternatively, the exhaust valve 152 may be actuated by other means, such as hydraulically, electronically, a combination of electro-hydraulically, and the like. When the exhaust valve 152 is placed in the open position (not shown), exhaust gases are advanced from the combustion chamber 138 to the exhaust manifold 148 via a fluid path that includes the exhaust port 126 and the exhaust passage 146. From the exhaust manifold 148, exhaust gases are advanced to an exhaust conduit 150. When the exhaust valve 152 is placed in the closed position (shown in FIG. 1), exhaust gases are prevented from advancing from the combustion chamber 138 to the exhaust manifold 148 since the exhaust valve 152 blocks fluid flow through the exhaust port 126.

Combustion of the mixture of fuel and air in the combustion chamber 138 produces a number of exhaust gases. After the mixture of fuel and air is combusted in the combustion chamber 138, exhaust gases are advanced through the exhaust conduit 150. Included among the exhaust gases are quantities of oxides of nitrogen ($NO_x$), hydrocarbons (HC), carbon monoxide (CO), smoke, and the like.

The engine assembly 104 further includes a controller 164. The controller 164 is preferably a microprocessor-based engine control unit (ECU). The controller 164 may perform a variety of functions, including, as described above, controlling actuation of the fuel injector 156.

Figure 2:
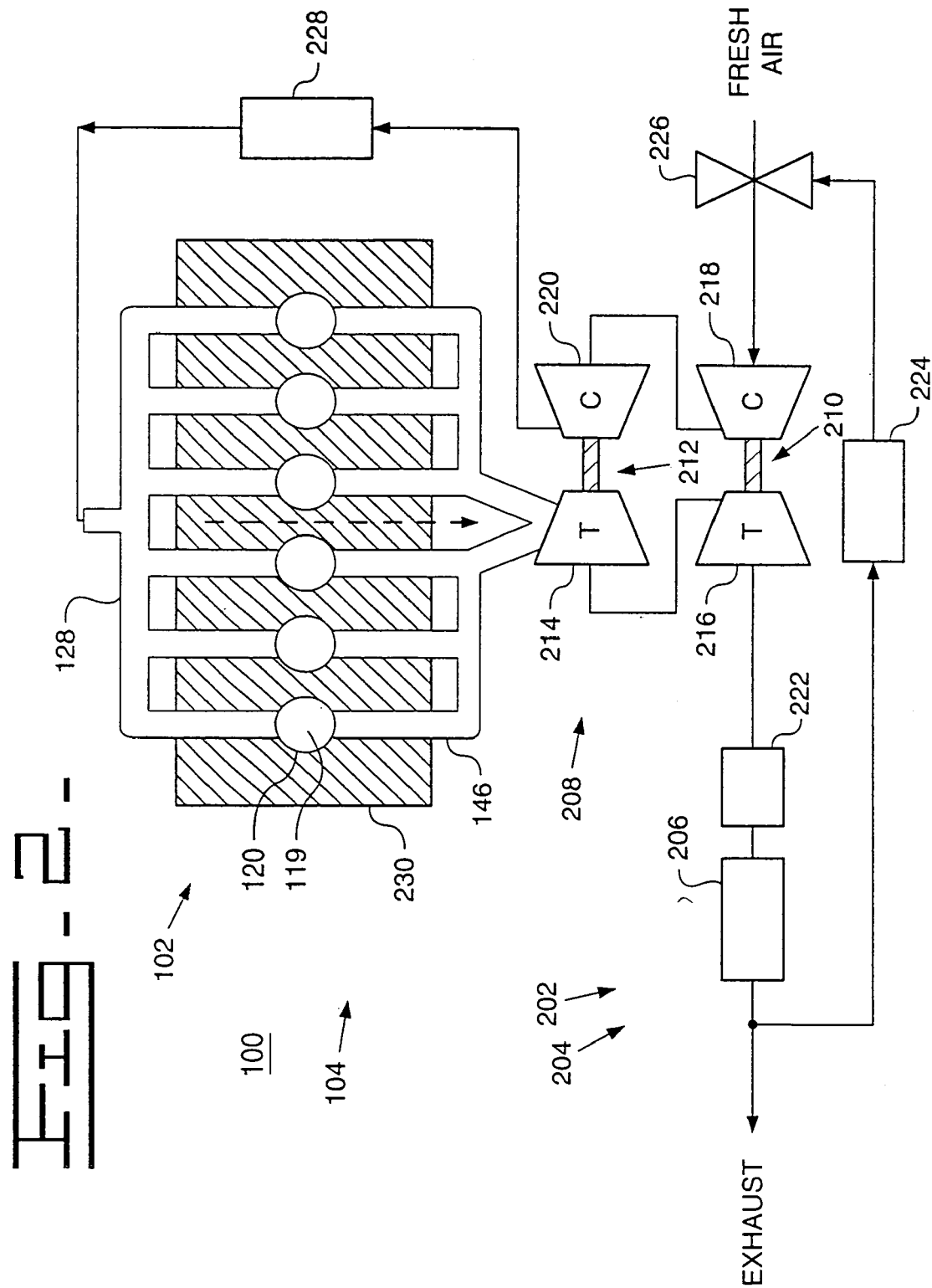
FIG. 2 is a block diagram illustrating an engine including an exhaust gas recirculation (EGR) system.

Referring to FIG. 2, a schematic representation of an engine 102 having an intake conduit 128 and an exhaust passage 146 is shown. An engine block 230 provides housing for at least one cylinder 119. FIG. 2 depicts six cylinders 119. However, any number of cylinders 119 could be used, for example, one, three, six, eight, ten, twelve, or any other number. The intake conduit 128 provides an intake path for each cylinder 119 for air, recirculated exhaust gases, or a combination thereof. The exhaust passage 146 provides an exhaust path for each cylinder 119 for exhaust gases.

In the embodiment shown in FIG. 2, a two-stage turbocharger system 208 is illustrated. The turbocharger system 208 includes a first turbocharger stage 210 having a low pressure turbine 216 and a first stage compressor 218. The turbocharger system 208 also includes a second turbocharger stage 212 having a high pressure turbine 214 and a second stage compressor 220. The two-stage turbocharger system 208 operates to increase the pressure of the air and exhaust gases being delivered to the cylinders 119 via the intake conduit 128, and to maintain a desired air to fuel ratio during an extended open duration of an intake valve, which is described in more detail below. It is noted that a two-stage turbocharger system 208 is not required for operation of the present invention. Other types of turbocharger systems, such as a high pressure ratio single-stage turbocharger system, a variable geometry turbocharger system, and the like, may be used instead.

The engine assembly includes an exhaust system 202, which in turn includes an exhaust gas recirculation (EGR) system 204. The EGR system 204 shown in FIG. 2 is typical of a low pressure EGR system in an internal combustion engine. Variations of the EGR system 204 shown may also be used with the present invention. Furthermore, other types of EGR systems, for example, by-pass, venturi, piston-pumped, peak clipping, and back pressure, could be used as well.

An oxidation catalyst 222 receives exhaust gases from the low pressure turbine 216. The oxidation catalyst 222 may also be coupled with a De-$NO_x$ catalyst to further reduce $NO_x$ emissions. A particulate matter (PM) filter 206 receives exhaust gases from the oxidation catalyst 222. Although the oxidation catalyst 222 and the PM filter 206 are shown as separate items, they may alternatively be combined into one package.

Some of the exhaust gases are delivered out the exhaust from the PM filter 206. However, a portion of exhaust gases are rerouted to the intake conduit 128 through an EGR cooler 224, through an EGR valve 226, and through the turbocharger system 208.

Figure 3:
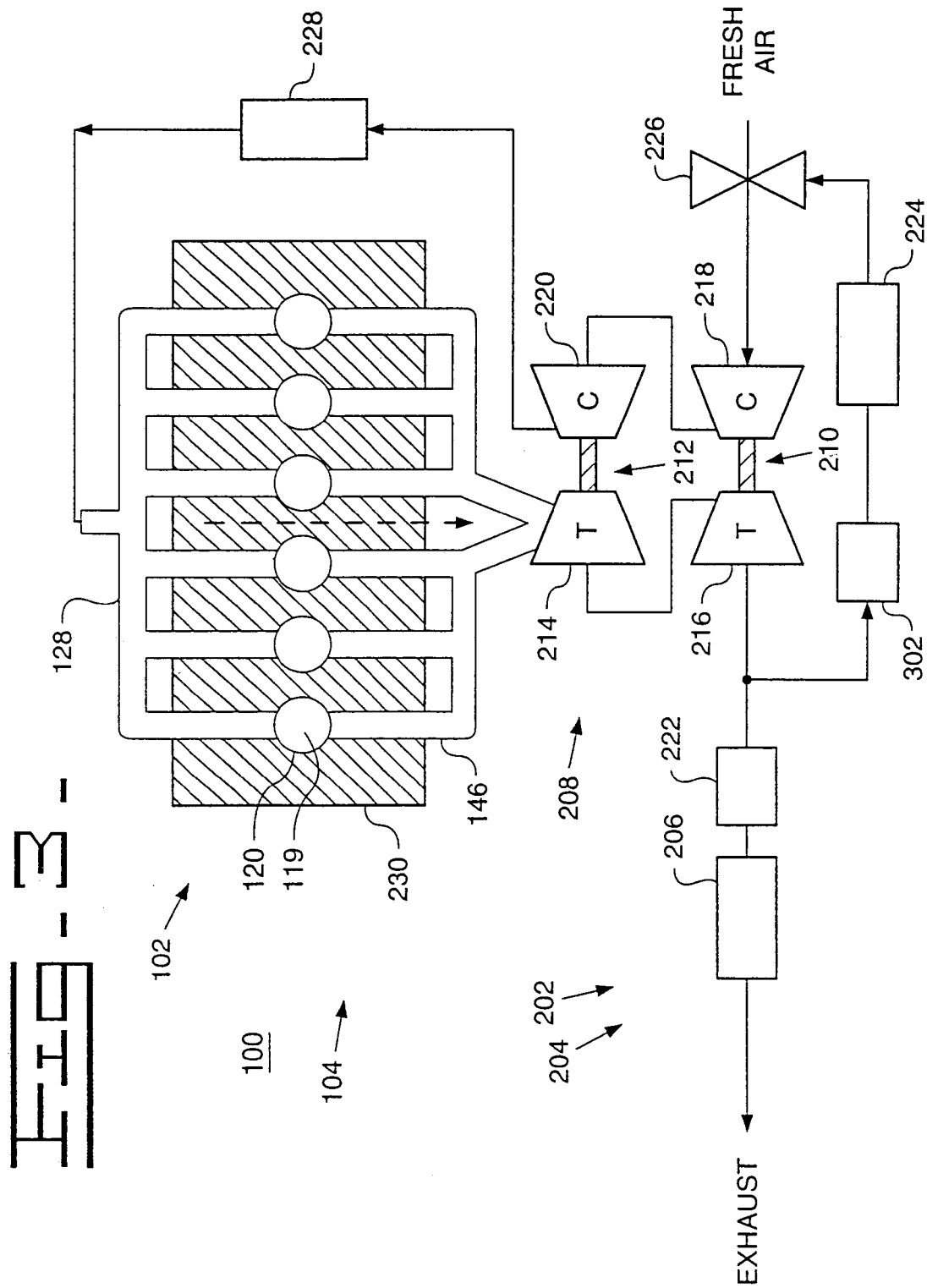
FIG. 3 is a block diagram illustrating a variation of the EGR system of FIG. 2.

FIG. 3 shows a variation of the EGR system 204 of FIG. 2. In FIG. 3, some of the exhaust gases are routed from the low pressure turbine 216, through the oxidation catalyst 222, and through the PM filter 206. However, a portion of exhaust gases are rerouted to the intake conduit 128 from the low pressure turbine 216, i.e., before entering the oxidation catalyst 222, through an additional PM filter 302, then through the EGR cooler 224, EGR valve 226, and the turbocharger system 208. The additional PM filter 302 may be smaller in size than the PM filter 206 in the main exhaust stream since only a portion of the exhaust gases need be filtered. In addition, by installing the additional PM filter 302 in the return path of the EGR system 204, the packaging and routing of the filter 302 and the associated input and output ductwork becomes more compact and manageable around the vicinity of the engine 102.

Referring to FIGS. 4a and 4b, operation of a fuel injector 156 suited for use with the present invention is shown. In FIG. 4a, the fuel injector nozzle 154, i.e., the tip of the injector 156, is shown in more detail. The fuel injector nozzle 154 includes a plurality of micro-sized holes 401., e.g., 10, 16, 24, 32 and the like, arranged in a pattern such that a desired fuel spray 402 is achieved. The exemplary fuel injector opening 154 of FIGS. 4a and 4b reflects a 24 hole "showerhead" design, arranged such that a first set of holes injects fuel spray at a first angle of dispersion $\alpha$ and a second set of holes injects fuel spray at a second angle of dispersion $\beta$. For example, a first set of 8 holes injects fuel spray at an angle $\alpha$ equal to about 50 degrees and a second set of 16 holes injects fuel spray at an angle $\beta$ equal to about 90 degrees. It is noted that any number and combination of holes, sets of holes, and angles of dispersion may be used as well without deviating from the scope of the present invention.

The design of the fuel injector nozzle 154 of FIGS. 4a and 4b offers the advantage of distributing the fuel spray 402 uniformly throughout desired portions of the combustion chamber 138, in particular with respect to a particular geometry of the piston 130. This control over the fuel spray 402 allows for fuel injection in advance of normal injection timing to allow sufficient time for the fuel and air, i.e., fluid medium, to mix homogeneously without fuel being allowed to deposit on the cylinder wall 120 prior to combustion. Preferably, the fuel spray 402 is configured to inject the fuel such that the fuel is dispersed substantially uniformly into the combustion chamber 138 and spaced from the cylinder wall 120. More specifically, the fuel spray 402 is intended to disperse throughout the combustion chamber 138 without any fuel contacting the cylinder wall 120, thus preventing fuel from quenching on the cylinder wall 120, which may be at a lower temperature than the remainder of the combustion chamber 138, and thus may result in increased levels of HC and CO during combustion.

Alternative fuel injection techniques may be used with the present invention. For example, FIGS. 5a–5c illustrate the function of a fuel injector 156 suited for use in mixed-mode operations. More specifically, the fuel injector opening 154 includes at least one HCCI nozzle outlet 504 and at least one conventional nozzle outlet 506. The HCCI nozzle outlet 504 is configured at an angle θ from a longitudinal axis 502 of the fuel injector 156 to inject fuel spray 504 in a pattern represented by FIG. 5b. The conventional nozzle outlet 506 is configured at an angle λ from the longitudinal axis 502 to inject fuel spray 504 in a pattern represented by FIG. 5c.

During HCCI mode operations, the fuel spray 402 is directed downward toward the piston 130. Injection takes place more in advance of top dead center, as can be seen by the relative position of the piston 130 in FIG. 5b compared to FIG. 5c, which allows more time for the fuel and fluid medium, e.g. air, to combine into a homogeneous mixture.

During conventional mode operations, e.g., diesel compression mode, the fuel spray 402 is directed more toward the sides of the cylinder 119 and injection takes place closer to top dead center, as evidenced by the position of the piston 130 in FIG. 5c.

It is noted that variations of the injector configuration of FIG. 5a may be used without deviating from the scope of the present invention. For example, a showerhead type of output nozzle may be used in place of the HCCI nozzle outlet 504 for HCCI operations, while the conventional nozzle outlet 506 may be employed during conventional diesel operations. Furthermore, in the fuel injector 156 of FIG. 5a, the angles θ and λ of the nozzle outlets 504,506 may be varied over a wide range to suit particular applications. Alternatively, the HCCI injection may be accomplished with port injection, i.e., the fuel is injected for example in the intake conduit 128 to provide for a homogeneous mixture of fuel and air in the combustion chamber 138. This method, however, may result in fuel condensing on the cylinder wall 120, thus contributing to oil degradation.

Figures 6A, 6B:
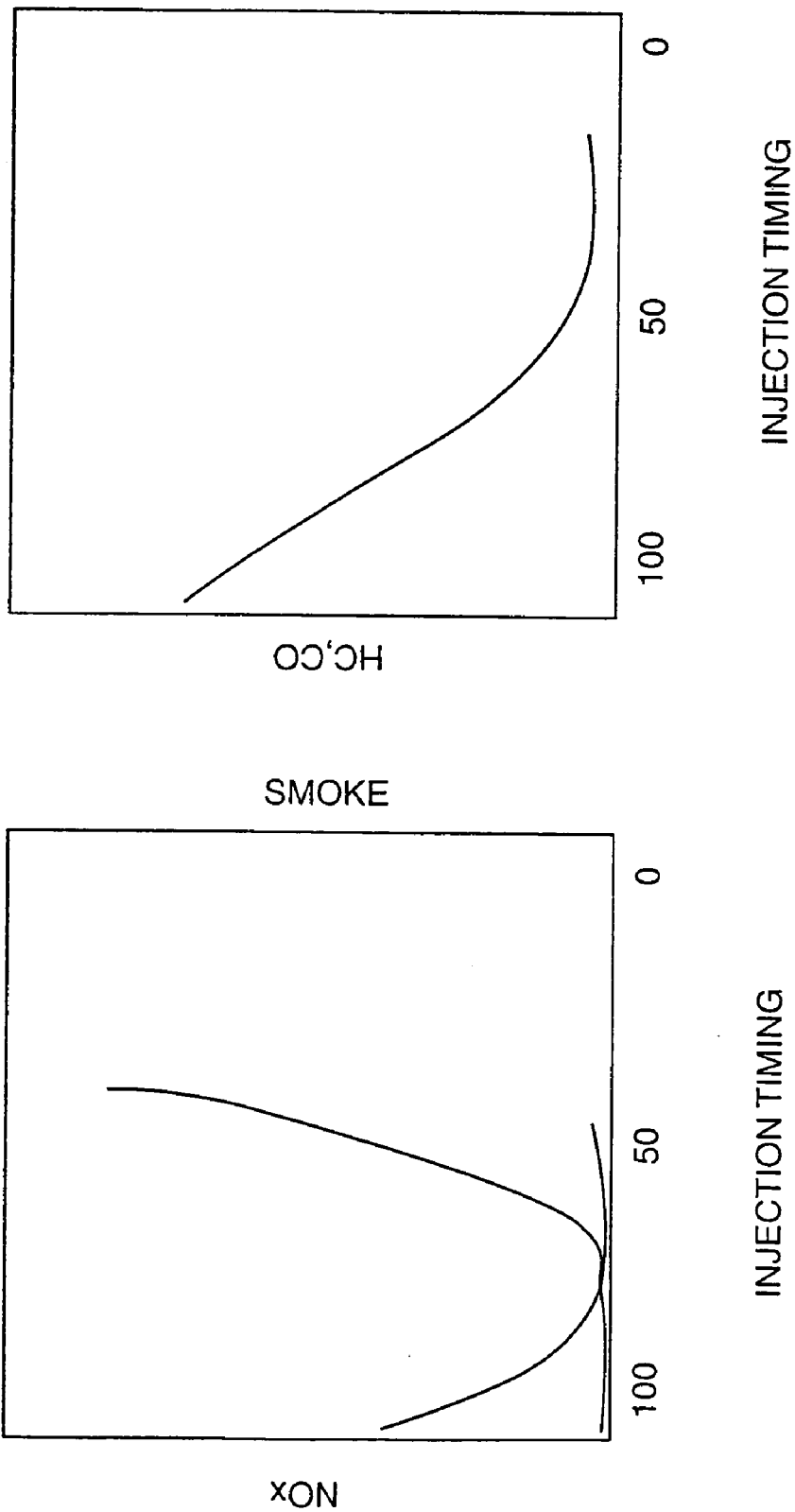
FIG. 6a is a graph depicting NOx and smoke emissions as a function of injection timing.
FIG. 6b is a graph depicting HC and CO emissions as a function of injection timing.

The timing of fuel injection may be varied to improve performance during HCCI operation. A timing range from about 50 degrees before top dead center (TDC) to about 180 degrees before TDC is typically used to insure a near complete homogeneous mixture of fuel and fluid medium. However, it is preferred to inject fuel as late as possible, i.e., closer to TDC, since excessive time for fuel presence in the cylinder 119 results in fuel condensing on the cylinder walls 120, which in turn contaminates and degrades the engine oil. It has been shown, as depicted in FIGS. 6a and 6b, that with a 24 hole showerhead fuel injector and no EGR an optimal injection timing of about 70 degrees before TDC may be achieved. More specifically, at about 70 degrees before TDC, levels of NOx and smoke are minimal and levels of HC and CO are greatly reduced. It has been further found that the addition of EGR may retard the optimal injection timing to about 60 degrees before TDC, thus alleviating fuel condensation even more. Further refinements in operating conditions, such as injector tip geometry, fuel dispersion patterns, EGR quantity, air intake, and the like, have enabled fuel injection in the range of from about 30 degrees before TDC to about 90 degrees before TDC, with optimal emissions reported when fuel injection occurs at about 40 degrees before TDC.

It is desired during HCCI operations to maintain a low combustion temperature. One reason is that levels of NOx are reduced at low combustion temperatures. One method for achieving low combustion temperatures is to introduce a high level of excess mass, i.e., large amounts of a fluid medium such as air, EGR, water, inert gas and the like, into the combustion chamber 138. Using air, i.e., fresh air, as the excess mass medium requires very large amounts of air to be delivered to the combustion chamber 138 to achieve desired excess mass levels. For example, an air to fuel ratio of about 36 to 1 or greater may be desired, corresponding to an equivalence ratio of 0.4 or less.

Alternatively, some other type of fluid medium may be used to achieve excess mass. For example, the use of EGR in place of at least a portion of fresh air may enable operation of the engine 102 at a near stoichiometric equivalence ratio, i.e., with an air to fuel ratio of about 14.5 to 1.

EGR may also be used to control a heat release rate and a pressure rise rate within the combustion chamber 138. For example, as the graph 702 shown in FIG. 7 depicts, a first plot 704 is indicative of a pressure rise rate during combustion in HCCI mode without the addition of EGR. The plot 704 illustrates a sharp rise in pressure in the combustion chamber 138. This sharp rise in pressure creates stresses in components such as the engine head 122. A second plot 706 is indicative of the pressure rise rate with EGR added. First, it is noted that the duration of combustion, i.e., the time for combustion to take place, has changed. More specifically, the combustion duration is extended. Second, it is noted that the peak pressure has changed. More specifically, the peak pressure is reduced. It has been found that the addition of EGR enables brake mean effective pressure (BMEP) levels to approach 1600 kPa. Without EGR, BMEP is limited to about 1100 kPa, i.e., about one half load.

The fluid added does not necessarily have to be EGR. More generally, the addition of a diluent such as EGR, water, carbon dioxide, nitrogen, and the like performs the function of lowering combustion temperature, limiting peak combustion pressure, and extending the duration of combustion. The diluent affects combustion by lowering the heat release rate in the combustion chamber 138 and creating a number of interim chemical reactions during combustion which serves to extend the combustion event. It is noted that the mass of the diluent contributes to the total fluid mass in the combustion chamber 138, the other portion of fluid mass being the oxidant, e.g., air, introduced to support combustion.

Referring to FIG. 8, the amount of EGR added is preferably quantified as a volumetric percentage, as exemplified by the following equation:

$$\% \, EGR = \frac{CO_2 \, (in)}{CO_2 \, (ex)} \times 100 \qquad (\text{Eq. 1})$$

where $CO_2$ (in) is an amount of carbon dioxide being returned to the engine by way of the EGR system 204, and $CO_2$ (ex) is an amount of carbon dioxide exhausted from the engine 102. The amount of EGR may be a significant percentage, for example 40% to 60%, under certain operating conditions. It is noted that the percentage of EGR may be quantified by some other method such as, for example, the mass of the EGR divided by the total mass in the combustion chamber 138.

Referring to FIG. 9a, a graph 902 of cylinder pressure vs. crank angle degrees (CAD) is shown. The plot indicates a first pressure rise portion 906 having a rise slope which levels off, then increases in slope to a second pressure rise portion 908. The "double-humped" curve is indicative of a homogeneous mixture during combustion, and thus defines an HCCI mode. In like manner, in FIG. 9b, a graph 904 of heat release rate vs. CAD is shown. The plot includes a first heat release peak portion 910, followed by a second heat release peak portion 912. As noted, the second heat release peak portion 912 is much larger in value than the first heat release peak portion 910. The curve serves to define an HCCI mode as well.

The excess mass may be provided by the use of high boost pressure at the intake conduit 128, i.e., intake manifold, of the engine 102. Exemplary techniques for providing high boost pressure are described below.

Although the introduction of excess mass serves to control the pressure rise rate in the combustion chamber 138, it is also desired to control a peak pressure during combustion. As FIG. 7 illustrates, the first plot 704 has a peak pressure that is higher in value than the peak pressure of the second plot 706. One method of controlling the peak pressure is by use of a variable compression ratio (VCR).

There are many techniques in use which provide VCR of an engine. One common strategy is to employ variable valve timing, in particular variable intake valve timing. For example, an intake valve may be kept open for a period of time into a compression cycle, for example from about 20 to about 50 degrees into compression. Variable valve timing may be accomplished by several means. Exemplary techniques may include mechanical, e.g., control of cam actuation, hydraulic, electric, electro-hydraulic, and the like.

Another common strategy, and one that may be more effective than variable valve timing, is to vary the geometric characteristics of a cylinder. For example, as depicted in FIG. 10, a secondary cylinder 1002 may be used in cooperation with a secondary piston 1004 to vary the effective volume of the cylinder 119. A rod 1006 connected to the secondary piston 1004 is also connected to an actuator 1008, such as a cam actuator, a hydraulic actuator, a solenoid actuator, or other actuation device. As the position of the secondary piston 1004 is varied in the secondary cylinder 1002, the effective compression ratio of the piston 130 and cylinder 119 is varied. It is noted that the example of FIG. 10 is but one of many methods by which the compression ratio of a cylinder may be varied using geometric techniques.

Preferably, to enable combustion to occur at a desired time, the VCR is varied as a function of engine speed and engine load. Typically, as speed and load increases, more fuel is delivered to the combustion chamber 138. This additional fuel causes an increase in pressure. The VCR may be lowered as speed and load increases to help compensate for this pressure increase. An exemplary range for compression ratio may be from about 8:1 to about 16:1. For example, a compression ratio of 10:1 was used in a test engine running at about 75% load. Preferably, compression ignition rather than spark ignition is maintained during the above-referenced lower compression ratios.

Although the engine 102 may be operating in HCCI mode and may be using a fuel such as diesel, the addition of EGR as described above, for example about 40% to about 60% EGR, enables operation at near stoichiometric. Under these conditions, it is possible to use a 3-way catalyst for further reductions in HC, CO and NOx. For example, referring to FIG. 11, an exemplary 3-way catalyst suited for use with the present invention is shown.

FIG. 11 shows a series combination catalytic converter 1110 in which three different catalytic substrates 1133, 1134 and 1135 are mounted in series within an individual tubular housing 1122. The inner structure includes mounting each of the catalytic substrates in its own sub-can 1130, 1131 and 1132, respectively. Tubular housing 1122 may be formed from thin stainless steel and may be formed on the outlet end 1124 with an annular retaining lip 1125 that prevents the individual sub-cans from escaping through the outlet. In addition, the curvature of the bend which creates retaining lip 1125 may be useful as a guide when mounting the converter 1110 in an opening having a diameter very close to that of the housing 1122. Each of the sub-cans 1130, 1131 and 1132 may be held within the tubular housing 1122 by a peripheral seam weld at corners 1128.

The substrate 1133 may be coated with a typical deNOx catalyst, such as a combination precious metal and zeolite catalyst. The substrate 1134 may be coated with a catalyst appropriate to target secondary undesirable nitrogen compounds existing in the exhaust after exiting the substrate 1133. After emerging from the substrate 1134, the exhaust contains very low levels of NOx compounds and even less undesirable secondary nitrogen compounds which would otherwise become NOx compounds after proceeding through an oxidation catalyst. The substrate 1135 may be coated with an oxidation catalyst to promote the conversion of any existing HC and CO into carbon dioxide and water. Only small amounts of the exhaust are turned back into undesirable NOx compounds after passing through oxidation catalyst substrate 1135. Upon exiting the converter 1110 at the outlet 1124, the exhaust has acceptable levels of both HC and NOx.

The sub-cans 1130, 1131 and 1132 are preferably made from relatively thin stainless steel that is rolled on both ends to create an annular retaining lip that traps the individual ceramic substrates 1133, 1134 and 1135 within the sub-cans. A matting material 1129 may be mounted between the inner surface of each sub-can and the outer surface of each substrate. The edges of the individual strips of matting 1129 may be shielded from the corrosive effects of the exhaust by end rings 1127. Each of the sub-cans may be fixed within the tubular housing 1122 via a peripheral seam weld at the annular corners 1128.

It is noted that the above example of a 3-way catalyst is for exemplary purposes only, and that variations of the above catalyst may be used as well. Furthermore, other types of catalysts, e.g., deNOx catalysts only, oxidation catalysts only, and the like, may be used as well.

The large amounts of excess mass, e.g., EGR, will require a significant level of boost pressure, i.e., intake manifold pressure, to deliver the excess mass into the combustion chamber 138. For example, a boost pressure value of about 4.5 to 1 or higher may be required under full load operating conditions. That is, the pressure at the intake manifold will need to be at least 456 kPa. The achievement of this high boost pressure requires an air system capable of generating sufficient pressure. For example, the 2-stage turbocharger system 208 of FIGS. 2 and 3 illustrates one possible air system capable of generating sufficient boost pressure.

Figure 12:
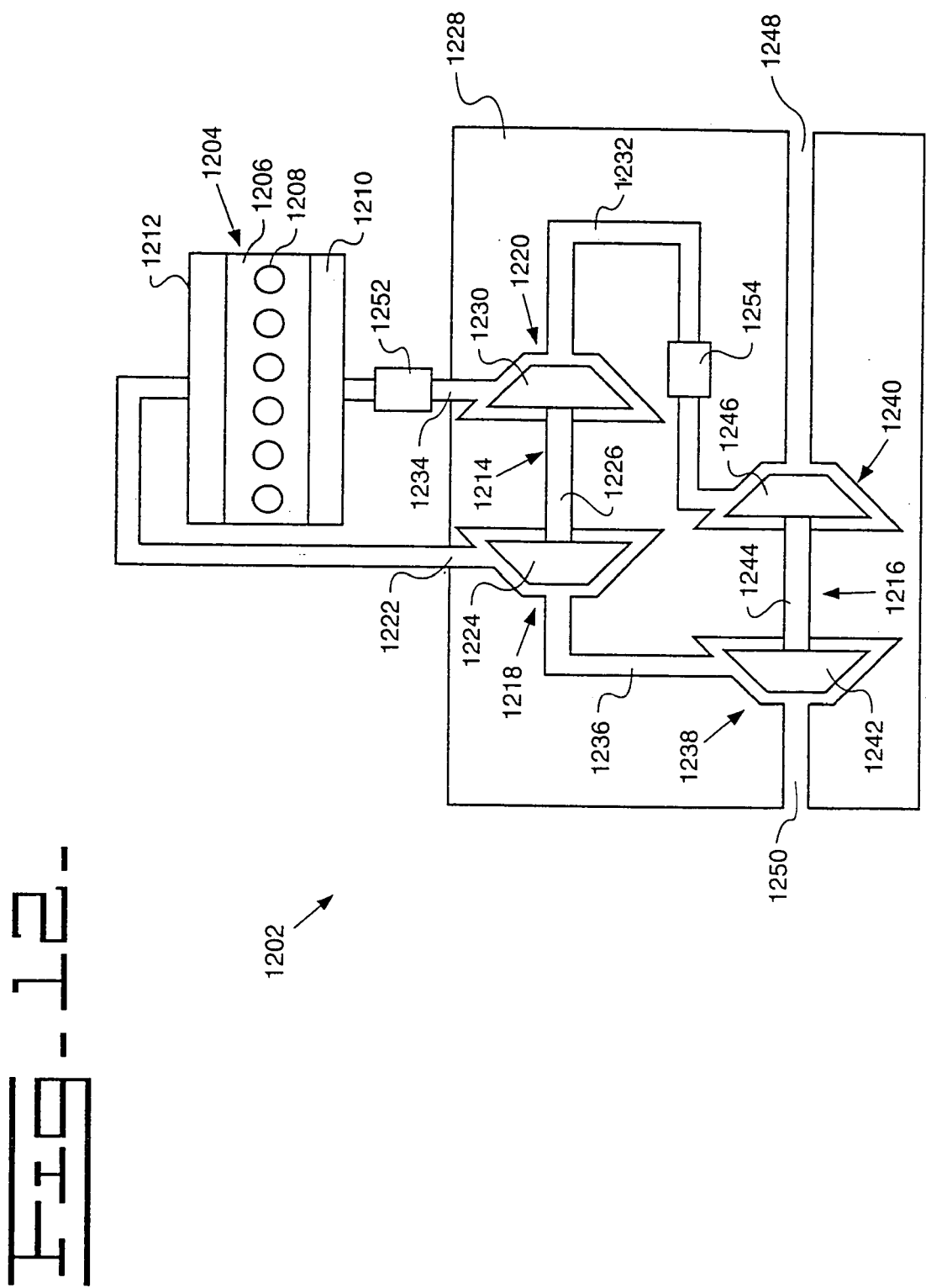
FIG. 12 is a diagrammatic illustration of a first exemplary air assist system for an engine.
Figure 13:
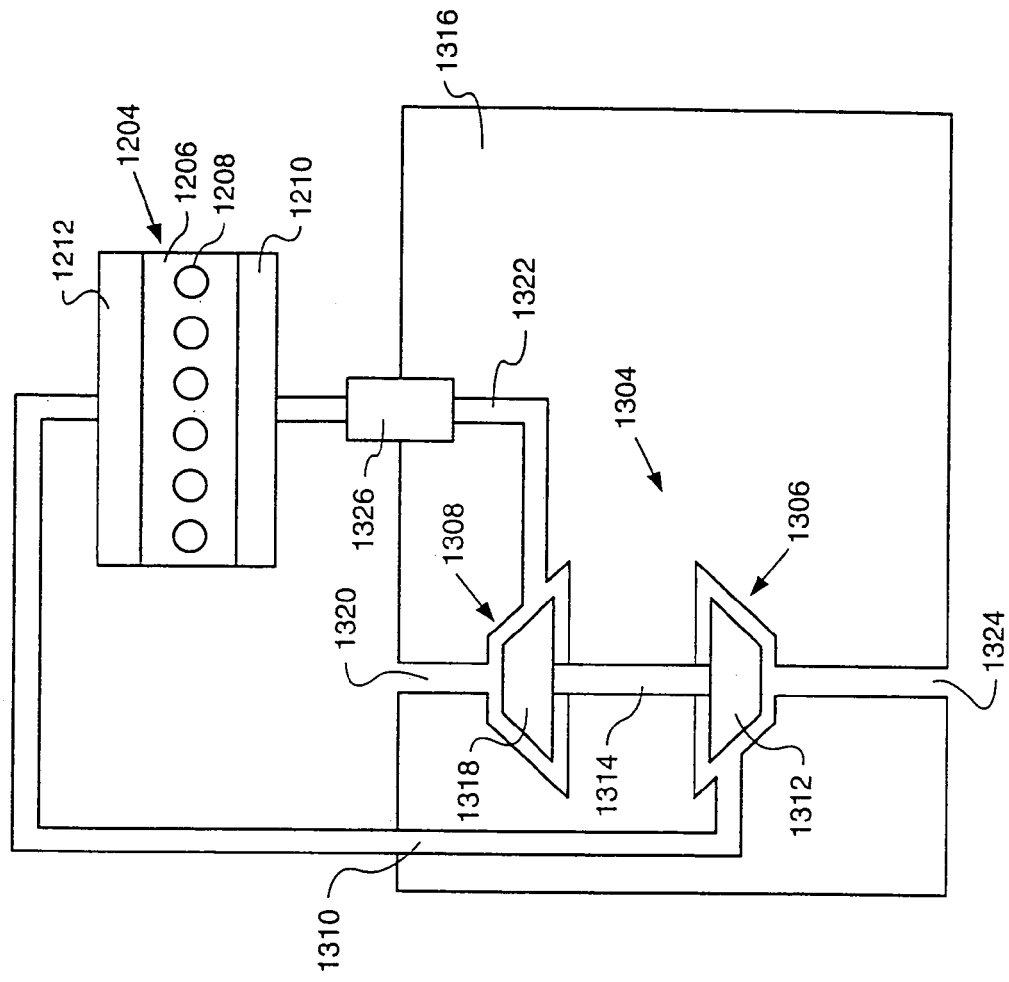
FIG. 13 is a diagrammatic illustration of a second exemplary air assist system.
Figure 14:
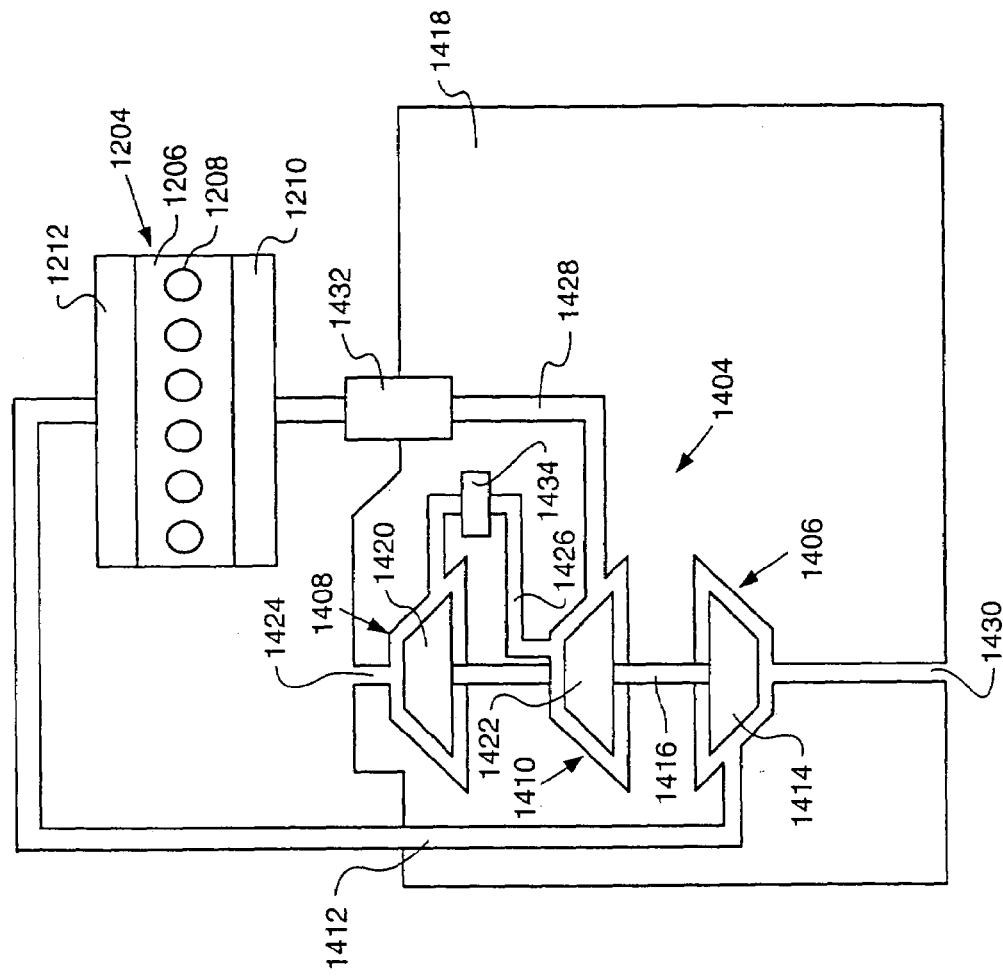
FIG. 14 is a diagrammatic illustration of a third exemplary air assist system.

Referring to FIGS. 12–14, exemplary variations of the turbocharger system 208 are shown. Discussion of the components of FIGS. 12–14 is provided below, with new element labeling to provide further clarification of various air systems.

Referring to FIG. 12, an exemplary air supply system 1202 for an internal combustion engine 1204, for example, a four-stroke, diesel engine, is provided. The internal combustion engine 1204 includes an engine block 1206 defining a plurality of combustion cylinders 1208, the number of which depends upon the particular application. For example, a 4-cylinder engine would include four combustion cylinders, a 6-cylinder engine would include six combustion cylinders, etc. In the exemplary embodiment of FIG. 12, six combustion cylinders 1208 are shown.

The internal combustion engine 1204 also includes an intake manifold 1210 and an exhaust manifold 1212. The intake manifold 1210 provides fluid, for example, air or a fuel/air mixture, to the combustion cylinders 1208. The exhaust manifold 1212 receives exhaust fluid, for example, exhaust gas, from the combustion cylinders 1208. The intake manifold 1210 and the exhaust manifold 1212 are shown as a single-part construction for simplicity in the drawing. However, it should be appreciated that the intake manifold 1210 and/or the exhaust manifold 1212 may be constructed as multi-part manifolds, depending upon the particular application.

The air supply system 1202 includes a first turbocharger 1214 and may include a second turbocharger 1216. The first and second turbochargers 1214, 1216 may be arranged in series with one another such that the second turbocharger 1216 provides a first stage of pressurization and the first turbocharger 1214 provides a second stage of pressurization. For example, the second turbocharger 1216 may be a low pressure turbocharger and the first turbocharger 1214 may be a high pressure turbocharger. The first turbocharger 1214 includes a turbine 1218 and a compressor 1220. The turbine 1218 is fluidly connected to the exhaust manifold 1212 via an exhaust duct 1222. The turbine 1218 includes a turbine wheel 1224 carried by a shaft 1226, which in turn may be rotatably carried by a housing 1228, for example, a single-part or multi-part housing. The fluid flow path from the exhaust manifold 1212 to the turbine 1218 may include a variable nozzle (not shown) or other variable geometry arrangement adapted to control the velocity of exhaust fluid impinging on the turbine wheel 1224.

The compressor 1220 includes a compressor wheel 1230 carried by the shaft 1226. Thus, rotation of the shaft 1226 by the turbine wheel 1224 in turn may cause rotation of the compressor wheel 1230.

The first turbocharger 1214 may include a compressed air duct 1232 for receiving compressed air from the second turbocharger 1216 and an air outlet line 1234 for receiving compressed air from the compressor 1220 and supplying the compressed air to the intake manifold 1210 of the engine 1204. The first turbocharger 1214 may also include an exhaust duct 1236 for receiving exhaust fluid from the turbine 1218 and supplying the exhaust fluid to the second turbocharger 1216.

The second turbocharger 1216 may include a turbine 1238 and a compressor 1240. The turbine 1238 may be fluidly connected to the exhaust duct 1236. The turbine 1238 may include a turbine wheel 1242 carried by a shaft 1244, which in turn may be rotatably carried by the housing 1228. The compressor 1240 may include a compressor wheel 1246 carried by the shaft 1244. Thus, rotation of the shaft 1244 by the turbine wheel 1242 may in turn cause rotation of the compressor wheel 1246.

The second turbocharger 1216 may include an air intake line 1248 providing fluid communication between the atmosphere and the compressor 1240. The second turbocharger 1216 may also supply compressed air to the first turbocharger 1214 via the compressed air duct 1232. The second turbocharger 1216 may include an exhaust outlet 1250 for receiving exhaust fluid from the turbine 1238 and providing fluid communication with the atmosphere. In an embodiment, the first turbocharger 1214 and second turbocharger 1216 may be sized to provide substantially similar compression ratios. For example, the first turbocharger 1214 and second turbocharger 1216 may both provide compression ratios of between 2 to 1 and 3 to 1, resulting in a system compression ratio of at least 4:1 with respect to atmospheric pressure. Alternatively, the second turbocharger 1216 may provide a compression ratio of 3 to 1 and the first turbocharger 1214 may provide a compression ratio of 1.5 to 1, resulting in a system compression ratio of 4.5 to 1 with respect to atmospheric pressure.

The air supply system 1202 may include an air cooler 1252, for example, an aftercooler, between the compressor 1220 and the intake manifold 1210. The air cooler 1252 may extract heat from the air to lower the intake manifold temperature and increase the air density. Optionally, the air supply system 1202 may include an additional air cooler 1254, for example, an intercooler, between the compressor 1240 of the second turbocharger 1216 and the compressor 1220 of the first turbocharger 1214. Alternatively, the air supply system 1202 may optionally include an additional air cooler (not shown) between the air cooler 1252 and the intake manifold 1210. The optional additional air cooler may further reduce the intake manifold temperature.

FIG. 13 is a block diagram illustrating another exemplary air supply system 1302 for the internal combustion engine 1204. The air supply system 1302 may include a turbocharger 1304, for example, a high-efficiency turbocharger capable of producing at least about a 4.5 to 1 compression ratio with respect to atmospheric pressure. The turbocharger 1304 may include a turbine 1306 and a compressor 1308. The turbine 1306 may be fluidly connected to the exhaust manifold 1212 via an exhaust duct 1310. The turbine 1306 may include a turbine wheel 1312 carried by a shaft 1314, which in turn may be rotatably carried by a housing 1316, for example, a single-part or multi-part housing. The fluid flow path from the exhaust manifold 1212 to the turbine 1306 may include a variable nozzle (not shown), which may control the velocity of exhaust fluid impinging on the turbine wheel 1312.

The compressor 1308 may include a compressor wheel 1318 carried by the shaft 1314. Thus, rotation of the shaft 1314 by the turbine wheel 1312 in turn may cause rotation of the compressor wheel 1318. The turbocharger 1304 may include an air inlet 1320 providing fluid communication between the atmosphere and the compressor 1308 and an air outlet 1322 for supplying compressed air to the intake manifold 1210 of the engine 1204. The turbocharger 1304 may also include an exhaust outlet 1324 for receiving exhaust fluid from the turbine 1306 and providing fluid communication with the atmosphere.

The air supply system 1302 may include an air cooler 1326 between the compressor 1308 and the intake manifold 1210. Optionally, the air supply system 1302 may include an additional air cooler (not shown) between the air cooler 1326 and the intake manifold 1210.

FIG. 14 is a block diagram illustrating another exemplary air supply system 1402 for the internal combustion engine 1204. The air supply system 1402 may include a turbocharger 1404, for example, a turbocharger 1404 having a turbine 1406 and two compressors 1408, 1410. The turbine 1406 may be fluidly connected to the exhaust manifold 1212 via an inlet duct 1412. The turbine 1406 may include a turbine wheel 1414 carried by a shaft 1416, which in turn may be rotatably carried by a housing 1418, for example, a single-part or multi-part housing. The fluid flow path from the exhaust manifold 1212 to the turbine 1406 may include a variable nozzle (not shown), which may control the velocity of exhaust fluid impinging on the turbine wheel 1414.

The first compressor 1408 may include a compressor wheel 1420 carried by the shaft 1416, and the second compressor 1410 may include a compressor wheel 1422 carried by the shaft 1416. Thus, rotation of the shaft 1416 by the turbine wheel 1414 in turn may cause rotation of the first and second compressor wheels 1420, 1422. The first and second compressors 1408, 1410 may provide first and second stages of pressurization, respectively.

The turbocharger 1404 may include an air intake line 1424 providing fluid communication between the atmosphere and the first compressor 1408 and a compressed air duct 1426 for receiving compressed air from the first compressor 1408 and supplying the compressed air to the second compressor 1410. The turbocharger 1404 may include an air outlet line 1428 for supplying compressed air from the second compressor 1410 to the intake manifold 1210 of the engine 1204. The turbocharger 1404 may also include an exhaust outlet 1430 for receiving exhaust fluid from the turbine 1406 and providing fluid communication with the atmosphere.

For example, the first compressor 1408 and second compressor 1410 may both provide compression ratios of between 2 to 1 and 3 to 1, resulting in a system compression ratio of at least 4:1 with respect to atmospheric pressure. Alternatively, the second compressor 1410 may provide a compression ratio of 3 to 1 and the first compressor 1408 may provide a compression ratio of 1.5 to 1, resulting in a system compression ratio of 4.5 to 1 with respect to atmospheric pressure.

The air supply system 1402 may include an air cooler 1432 between the second compressor 1410 and the intake manifold 1210. Optionally, the air supply system 1402 may include an additional air cooler 1434 between the first compressor 1408 and the second compressor 1410 of the turbocharger 1404. Alternatively, the air supply system 1402 may optionally include an additional air cooler (not shown) between the air cooler 1432 and the intake manifold 1210.

It is noted that other types of air supply systems could be used as well. For example, an air-to-EGR cooler, a blower and turbocharger arrangement, and an electric turbocharger assist are a few of the types of air supply systems which may provide the needed boost pressure for the present invention.

Figure 15:
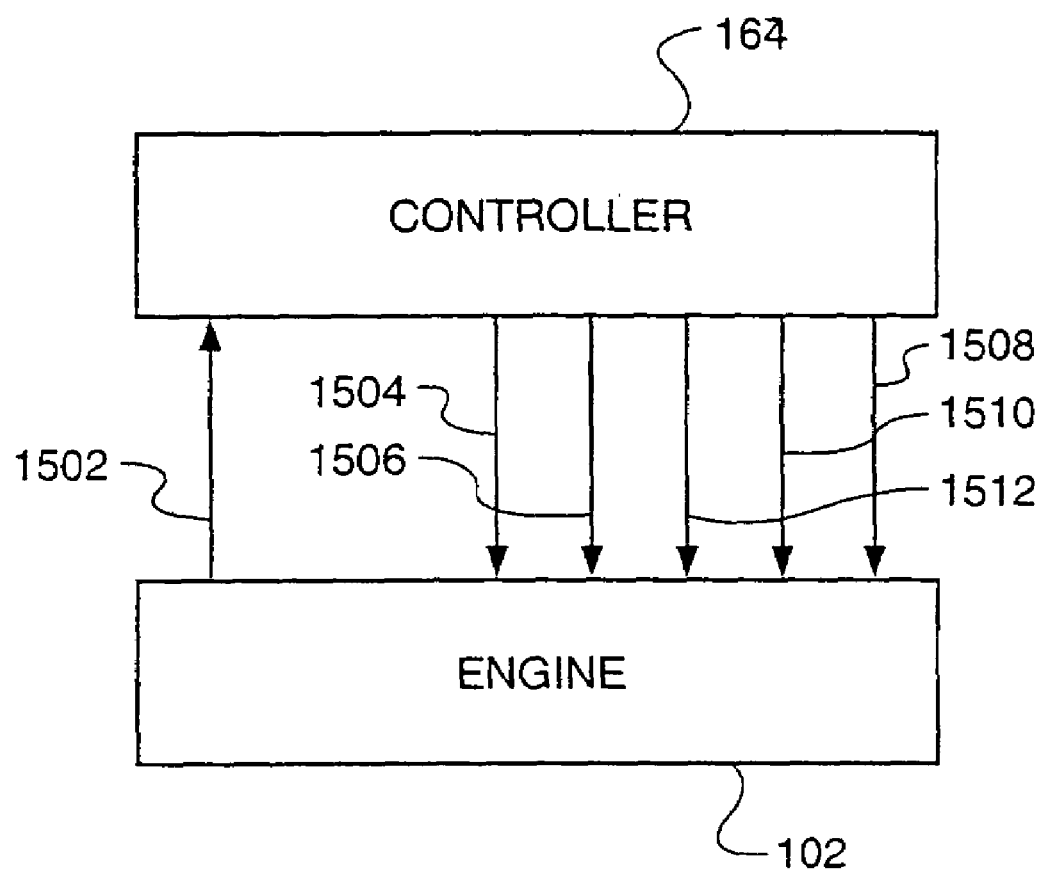
FIG. 15 is a block diagram illustrating an exemplary control system for an engine.

Referring to FIG. 15, a block diagram illustrating an embodiment of a control system for the present invention is shown. The engine 102 is monitored and controlled by the controller 164, e.g., an electronic control module (ECM) typically used for engine monitoring and control.

A signal indicative of cylinder pressure feedback is delivered to the controller 164 by way of signal line 1502 and may be used to determine an event such as a start of combustion. The cylinder pressure feedback may be sensed directly, for example by a cylinder pressure sensor (not shown), or may be derived from other sensed parameters. For example, engine speed and load parameters may be monitored and used to determine a start of combustion event.

The controller 164 may, upon receipt of the cylinder pressure feedback signal, determine that some control of engine operations is needed. For example, it may be determined that the timing of the start of combustion should be changed. The controller 164 may have several options to use for controlling engine operations. For example, the controller 164 may deliver a control signal via signal line 1504 to modulate an intake manifold temperature, the controller 164 may deliver a control signal via signal line 1506 to modulate a timing of actuation of an intake valve, a control signal may be delivered via signal line 1508 to modulate a rate at which EGR is being delivered, a control signal may be delivered via signal line 1510 to modulate a timing of injection of fuel, or a control signal may be delivered, via signal line 1512 to modulate a boost pressure value. It is understood that any combination of the above control strategies may be employed. Furthermore, other control strategies may be incorporated as well.

The complexities of engine operation due to the interactions of many variables indicates that it may be desired to configure the controller 164 to use advanced techniques for data analysis and engine control. For example, it may be desired to incorporate a neural network (not shown) into the controller 164 to make control decisions based on an historical database of engine operations.

Figure 16:
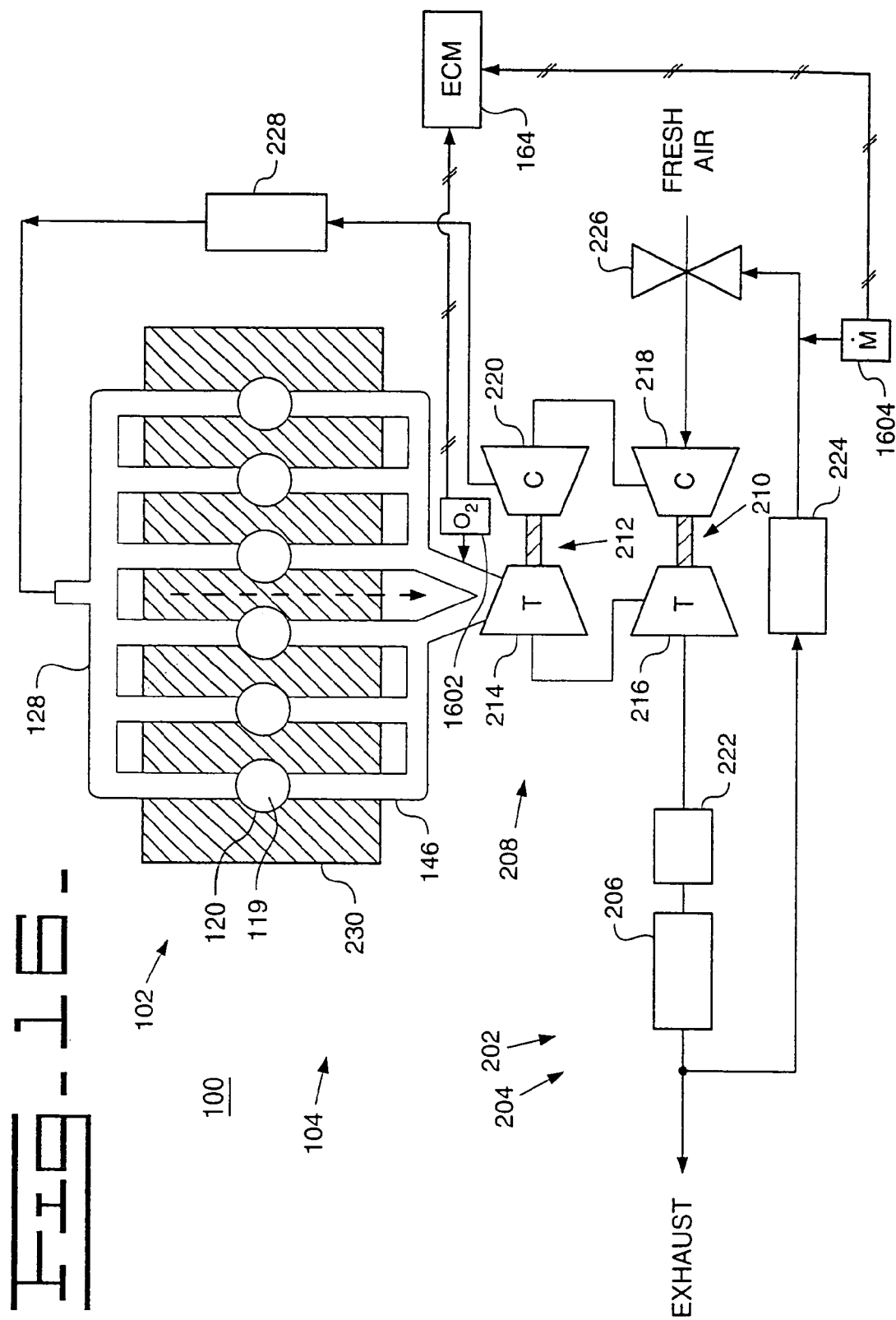
FIG. 16 is the block diagram of FIG. 2 including further features.

Referring to FIG. 16, the block diagram of FIG. 2 is reproduced with the addition of an oxygen sensor (O2) 1602 and a mass airflow sensor (MAF) 1604. The O2 sensor 1602 may be located at some position suitable for sensing an amount of oxygen in the exhaust gases after combustion, for example at the exhaust passage 146. The MAF sensor 1604 may be located at some position suitable for sensing the mass of EGR gases, for example prior to the EGR valve 226. Alternatively, the MAF sensor 1604 may be located elsewhere, for example after the EGR valve 226 to sense a total flow of mass, e.g., EGR plus fresh air, being delivered to the engine 102.

The O2 and MAF sensors 1602,1604 may be used separately or in combination, and may deliver sensed values to the controller 164 for processing to further determine and control a rate of EGR being delivered to the engine 102.

In an alternate embodiment, it may be desired to incorporate membrane technology to use nitrogen as an inert gas in place of, or in combination with, EGR as the excess mass used to control heat release rates in the combustion chamber 138. For example, FIG. 17 depicts an exemplary intake air separation system 1702 suited for use with the present invention.

Figure 17:
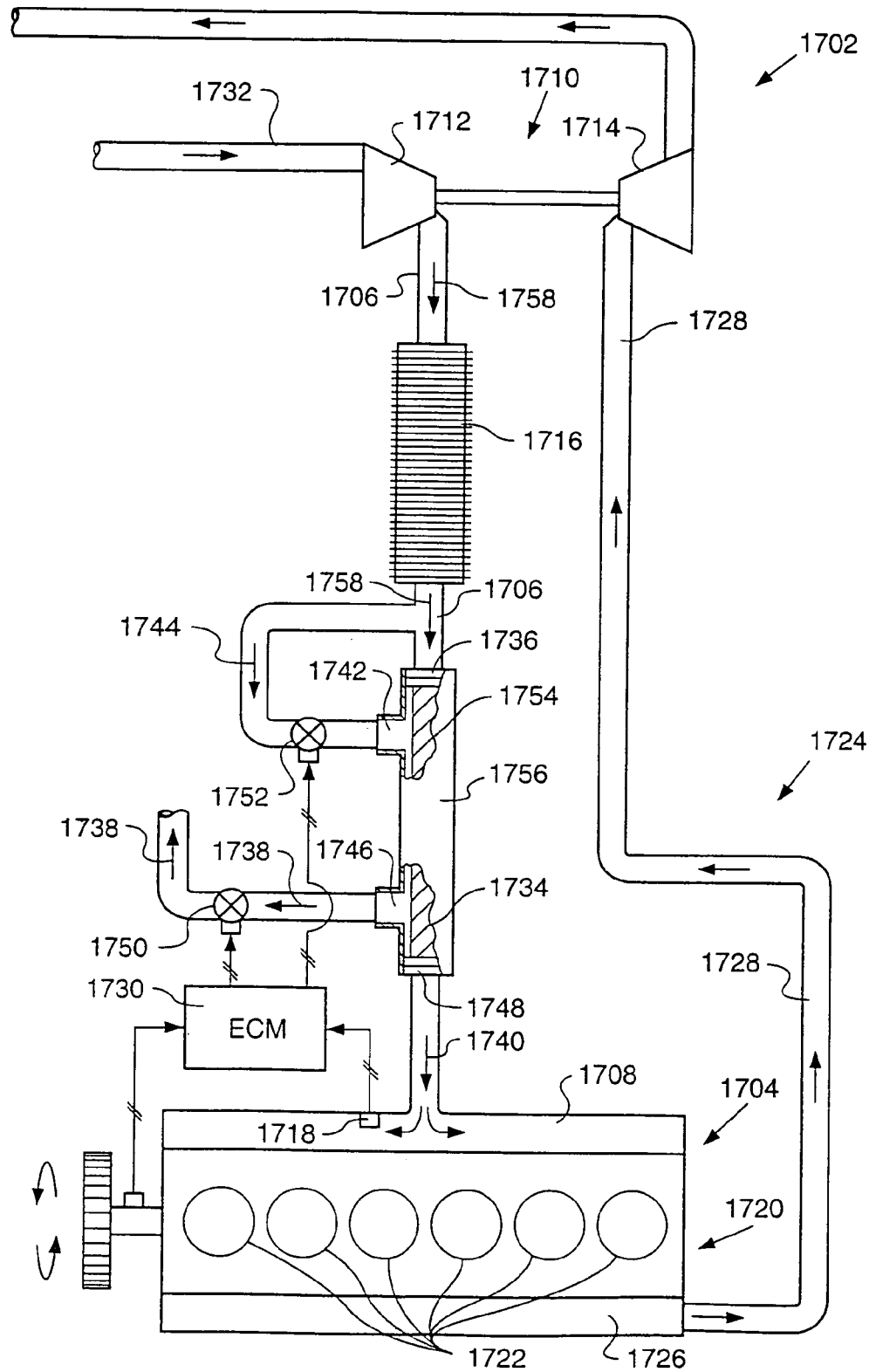
FIG. 17 is a diagrammatic illustration of an exemplary membrane technology system suited for use with the present invention.

Referring to FIG. 17, a diagrammatic illustration of an intake air separation system 1702 for an engine 1704 is shown. The intake side of the engine 1704 includes an intake air conduit 1706, an intake manifold 1708, intake air pressurizing device 1710, e.g., a turbocharger, and an intercooler or an air-to-air aftercooler 1716. The intake air pressurizing device 1710 may include an exhaust gas driven turbine 1714, which in turn drives a compressor 1712. The engine 1704 also includes a main combustion section 1720, and an exhaust system 1724. Although not shown in great detail, the typical main combustion section 1720 includes, among other elements, an engine block and a cylinder head forming a plurality of combustion cylinders 1722 therein. Associated with each of the cylinders 1722 is a fuel injector, a cylinder liner, at least one air intake port and corresponding intake valves, at least one exhaust gas port and corresponding exhaust valves, and a reciprocating piston moveable within each cylinder to define, in conjunction with the cylinder liner and cylinder head, the combustion chamber. The exhaust system 1724 of the engine 1704 includes an exhaust manifold 1726 or split exhaust manifolds, one or more exhaust conduits 1728, and the turbine 1714. Optionally, the exhaust system 1724 may include one or more aftertreatment devices (not shown) such as particulate traps, NOx adsorbers, oxidation and/or lean NOx catalysts, or other recent advances in exhaust gas aftertreatment. Finally, the engine 1704 includes an electronic control module (ECM) 1730, i.e., a controller, for operatively controlling the fuel injection timing and air system valve operations in response to one or more measured or sensed engine operating parameters, used as inputs to the ECM 1730.

The intake air conduit 1706 is in flow communication with intake air input 1732, the compressor 1712 of the intake air pressurizing device 1710, and the aftercooler 1716. Although the intake air separation system 1702 is shown and described in conjunction with a conventional turbocharged diesel engine, the disclosed system 1702 is equally useful on engines with a variable geometry turbocharger (VGT) or other supercharged engines, including engines with pressure wave supercharging devices. The intake manifold 1708 is connected to an end of the intake air conduit 1706. An inlet pressure sensor 1718 is shown located somewhere in the intake air separation system 1702, e.g., shown proximate the intake manifold 1708, and provides intake air pressure data to the ECM 1730. Other sensors such as temperature sensors, oxygen sensors (not shown), and the like may also be incorporated within the intake air separation system 1702 and likewise coupled as inputs to the ECM 1730. In addition, various other devices such as filters, valves, actuators, bypass conduits, etc., although not shown, may also be incorporated within the intake air separation system 1702. Any such electronically operative components such as valves and/or actuators are preferably operatively coupled to the ECM 1730 and operate in response to selected engine operating parameters or conditions, including engine speed, engine load, boost pressure conditions, etc.

The illustrated intake air separation system 1702 includes an intake air separation device 1734 disposed within the intake air separation system 1702 of the engine 1704. The intake air separation device 1734 may be adapted for receiving substantially all of the engine combustion air at an air separation device inlet 1736, i.e., an intake air inlet, and separating the same into a flow 1738 of oxygen enriched air, i.e., a permeate flow, and a flow 1740 of nitrogen enriched air, i.e., a retentate flow. The illustrated intake air separation device 1734 includes two inlets and two outlets. The first inlet is the intake air inlet 1736 that receives the air to be separated into an oxygen rich stream and a nitrogen rich stream. The second inlet is a purge air inlet 1742 that is adapted to receive a flow 1744 of sweep air or purge air which enhances the permeation effectiveness of the intake air separation device 1734. The purge air 1744 maybe taken from a flow of intake air 1758 from the compressor 1712 and the aftercooler 1716. Alternatively, the flow of purge air 1744 may be a separate flow of filtered ambient air. The first outlet, or permeate outlet 1746 of the intake air separation device 1734 is adapted to receive the permeate flow 1738 of oxygen enriched air combined with the flow of purge air 1744.

The second outlet, or retentate outlet 1748 is adapted to receive the retentate flow 1740 of nitrogen enriched air. Preferably, the intake air separation device 1734 is a full flow separation unit and thus there is no need for subsequent mixing of the nitrogen enriched air flow 1740 exiting the retentate outlet 1748 with more intake air. The retentate outlet 1748 is further in flow communication with the intake manifold 1708 of the engine 1704. A permeate flow valve 1750 may be disposed proximate the permeate outlet 1746.

The permeate flow valve 1750 is preferably actuated in response to signals received from ECM 1730 which controls the permeate flow 1738 away from the intake air separation device 1734, and thereby controls the flow 1740 from the retentate outlet 1748 to the intake manifold 1708. More specifically, the permeate flow valve 1750 located proximate the permeate outlet 1746 controls both the permeate flow 1738 and the flow of purge air 1744 away from intake air separation device 1734 and thus controls the relative concentrations of nitrogen and oxygen in the air directed to the intake manifold 1708 and to the combustion cylinders 1722.

The location of the permeate flow valve 1750 is preferably at or proximate to the permeate outlet 1746. Such an arrangement aids the responsiveness of the engine 1704 based on a relatively fast change in oxygen and nitrogen content of the air exiting the retentate outlet 1748 into the intake manifold 1708 when the permeate flow valve 1750 is actuated, e.g., opened or closed, during transient operating conditions. Selective operation of the permeate flow valve 1750 allows the engine 1704 to operate in essentially three different charge air modes, namely nitrogen enriched mode, i.e., valve partially or fully open, standard intake air mode, i.e., valve closed for selected length of time,.and transient oxygen enriched mode, which occurs for a short period or duration as the permeate flow valve 1750 is first closed. The exact location of the permeate flow valve 1750 is preferably optimized to take advantage of the different modes of charge air, and in particular the transient charge of oxygen enriched air that occurs when the permeate flow valve 1750 is first closed.

The intake air separation device 1734 preferably uses a plurality of selectively permeable separation membranes 1754 that separates ambient intake air into streams of oxygen enriched air and nitrogen enriched air. Such membranes 1754 are well known in the art.

The intake air separation device 1734 may include a housing or shell 1756, having the intake air inlet 1736, the purge air inlet 1742, the permeate outlet 1746, and the retentate outlet 1748. A plurality of selectively permeable membrane elements or fibers are disposed in a general longitudinal or helical, i.e., spiral, orientation within the housing 1756 and potted or sealed at each end. The air separation membranes 1754 are preferably hollow, porous, coated tubes through which selected gases such as hydrogen, helium, water vapors, carbon dioxide, and oxygen tend to permeate outwardly through the membranes at a relatively fast rate while other gases such as carbon monoxide, argon and nitrogen permeate less rapidly and are mostly retained and transported along the membrane tubes. Different gases present in the flow 1758 of intake air tend to permeate through the membrane 1754 at different relative permeation rates and generally through the sidewalls of the membrane 1754. The rate of permeation is also dependent in part on the membrane temperature, and therefore altering or controlling the temperatures of gases entering the intake air separation device 1734 ultimately controls permeability.

The intake air is introduced into the housing 1756 and membranes 1754 of the intake air separation device 1734 in an orientation or direction that is generally along the length of the membranes 1754. In this manner the flow 1758 of intake air is transported or flows generally along the length of the intake air separation device 1734. Conversely, the flow 1744 of purge air is introduced into the housing 1756 and membranes 1754 in a cross flow orientation or direction such that the flow 1744 of purge air flows generally across outer surfaces of the membranes 1754. The flow 1744 of puree air then exits the housing 1756 via the permeate outlet 1746 as part of the permeate flow 1738 and together with the permeated oxygen rich air. The retentate flow 1740 of nitrogen rich air exits from the housing 1756 via retentate outlet 1748.

The above description of an intake air separation device 1734 illustrate only one example of sweep or purge air flow configurations that produce good separation results. Various other flow configurations can also be employed. The various purge flow configurations offer differences in separation performance and packaging issues and can be tailored to the specific application in which the air separation device is used.

The compressor 1712 of the intake air pressurizing device 1710 is used to forcibly move intake air through the membrane-based intake air separation device 1734 in what is often referred to as the pressure mode. In like manner, the flow 1744 of purge air is received or diverted from the flow 1758 of boosted, cooled intake air and delivered to the purge air inlet 1742. A purge air valve 1752 operatively coupled to the ECM 1730 may be used to control the flow 1744 of purge air under various operating conditions. Thus, the flow 1744 of purge air and the flow of intake air 1758 are typically pressurized while the permeate flow 1738 of oxygen enriched air and purge air exiting the intake air separation device 1734 is preferably at a somewhat lower pressure, due to pressure losses incurred by flowing through the intake air separation device 1734. This pressure gradient across the membranes 1754 enables air separation to occur. As illustrated, the permeate flow 1738 is preferably vented to the atmosphere or otherwise fed to other parts of the engine 1704, including, but not limited to the exhaust system 1724. However, the permeate flow 1738 may also be delivered to the combustion cylinders 1722 to provide at least a portion of a supply of oxidant to support combustion. The retentate flow 1740 of nitrogen enriched air is fed to the intake manifold 1708 in a generally pressurized condition, albeit at a lower pressure than the feed or intake air pressure due to losses caused by the membrane-based intake air separation device 1734.

Referring briefly to FIG. 1, it may be desired to utilize variable valve timing to aid in performance of the present invention. For example, the temperature in the cylinder 119 may be increased, thus assisting in control of combustion, by varying the timing of the exhaust valve 152. More specifically, by varying the timing of closing of the exhaust valve 152, some of the hot residual gases from combustion are trapped in the combustion chamber 138 and the start of combustion for the next cycle is advanced.

It may also be desired to vary the timing of the intake valve 140 to modulate the air to fuel ratio during acceleration of the engine 102, thus further controlling combustion. Varying the timing of closing of the intake valve 140 serves to operate the engine 102 in a Miller cycle which lowers the effective compression ratio which in turn retards the start of combustion. Varying the timing of opening of the intake valve 140 allows hot exhaust gases to flow into the intake port 124, which advances the start of combustion.

Figure 18:
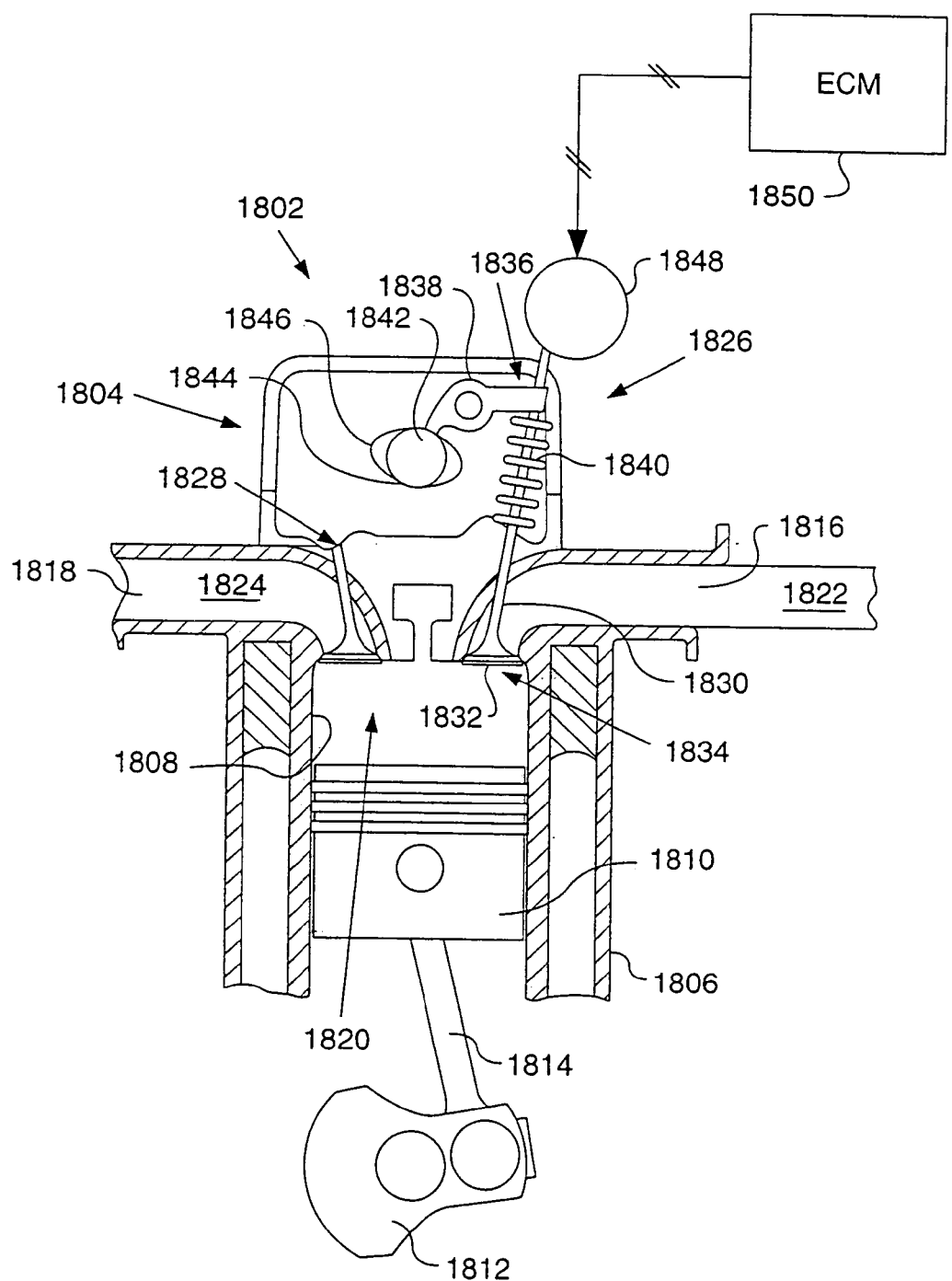
FIG. 18 is a diagrammatic illustration of an engine having an exemplary variable valve actuation system.
Figure 19:
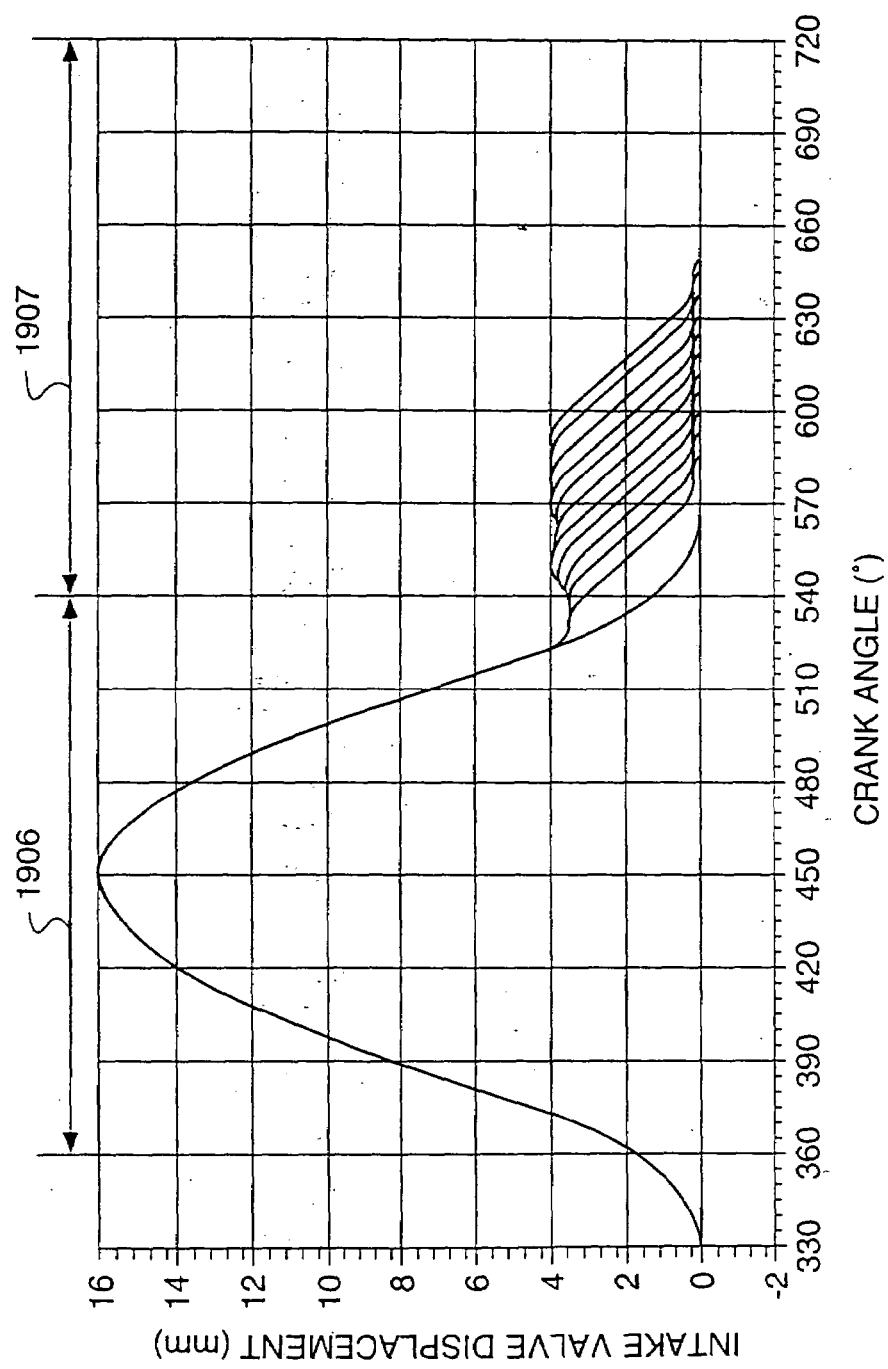
FIG. 19 is a graph depicting displacement of an intake valve as a function of crank angle degrees.

FIGS. 18 and 19 illustrate operation of an exemplary technique for achieving variable valve timing. Although the description below and FIGS. 18 and 19 depict variable valve operation of the intake valve, similar principles apply to varying the timing of an exhaust valve.

Referring to FIG. 18, a diagrammatic and cross-sectional illustration of a portion of an internal combustion engine 1802 is shown. A cylinder head 1804 is connected to an engine block 1806. The cylinder head 1804 houses one or more cylinders 1808. For purposes of illustration, FIG. 18 is described below with reference to one cylinder 1808.

The cylinder 1808 contains a piston 1810 slidably movable in the cylinder 1808. A crankshaft 1812 is rotatably disposed within the engine block 1806. A connecting rod 1814 couples the piston 1810 to the crankshaft 1812 so that sliding motion of the piston 1810 within the cylinder 1808 results in rotation of the crankshaft 1812. Similarly, rotation of the crankshaft 1812 results in a sliding motion of the piston 1810. For example, an uppermost position of the piston 1810 in the cylinder 1808 corresponds to a top dead center position of the crankshaft 1812, and a lowermost position of the piston 1810 in the cylinder 1808 corresponds to a bottom dead center position of the crankshaft 1812.

As one skilled in the art will recognize, the piston 1810 in a conventional, four-stroke engine cycle reciprocates between the uppermost position and the lowermost position during a combustion (or expansion) stroke, an exhaust stroke, an intake stroke, and a compression stroke. Meanwhile, the crankshaft 1812 rotates from the top dead center position to the bottom dead center position during the combustion stroke, from the bottom dead center to the top dead center during the exhaust stroke, from top dead center to bottom dead center during the intake stroke, and from bottom dead center to top dead center during the compression stroke. Then, the four-stroke cycle begins again. Each piston stroke correlates to about 180° of crankshaft rotation, or crank angle. Thus, the combustion stroke may begin at about 0° crank angle, the exhaust stroke at about 180°, the intake stroke at about 360°, and the compression stroke at about 540°.

The cylinder 1808 includes at least one intake port 1816 and at least one exhaust port 1818, each opening to a combustion chamber 1820. The intake port 1816 is coupled to an intake passageway 1822 and the exhaust port 1818 is coupled to an exhaust passageway 1824. The intake port 1816 is opened and closed by an intake valve assembly 1826, and the exhaust port 1818 is opened and closed by an exhaust valve assembly 1828. The intake valve assembly 1826 includes, for example, an intake valve 1830 having ahead 1832 at a first end 1834, with the head 1832 being sized and arranged to selectively close the intake port 1816. A second end 1836 of the intake valve 1830 is connected to a rocker arm 1838 or any other conventional valve-actuating mechanism. The intake valve 1830 is movable between a first position permitting flow from the intake port 1816 to enter the cylinder 1808 and a second position substantially blocking flow from the intake port 1816 to the cylinder 1808. Preferably, a spring 1840 is disposed about the intake valve 1830 to bias the intake valve 1830 to the second, closed position.

A camshaft 1842 carrying a cam 1844 with one or more lobes 1846 is arranged to operate the intake valve assembly 1826 cyclically based on the configuration of the cam 1844, the lobes 1846, and the rotation of the camshaft 1842 to achieve a desired intake valve timing. The exhaust valve assembly 1828 is configured in a manner similar to the intake valve assembly 1826 and is preferably operated by one of the lobes 1846 of the cam 1844. In one embodiment, the intake lobe 1846 is configured to operate the intake valve 1830 in a conventional Otto or diesel cycle, whereby the intake valve 1830 moves to the second, closed position from between about 10° before bottom dead center of the intake stroke and about 10° after bottom dead center of the compression stroke. Alternatively, the intake valve assembly 1826 and/or the exhaust valve assembly 1828 may be operated hydraulically, pneumatically, electronically, or by any combination of mechanics, hydraulics, pneumatics, and/or electronics.

In the preferred embodiment, the intake valve assembly 1826 includes a variable intake valve closing mechanism 1848 structured and arranged to selectively interrupt cyclical movement of and extend the closing timing of the intake valve 1830. The variable intake valve closing mechanism 1848 may be operated hydraulically, pneumatically, electronically, mechanically, or any combination thereof. For example, the variable intake valve closing mechanism 1848 may be selectively operated to supply hydraulic fluid, for example, at a low pressure or a high pressure, in a manner to resist closing of the intake valve 1830 by the bias of the spring 1840. That is, after the intake valve 1830 is lifted, i.e., opened, by the cam 1844, and when the cam 1844 is no longer holding the intake valve 1830 open, the hydraulic fluid may hold the intake valve 1830 open for a desired period. The desired period may change depending on the desired performance of the engine 1802. Thus, the variable intake valve closing mechanism 1848 enables the engine 1802 to operate under a conventional Otto or diesel cycle or under a variable late-closing Miller cycle. In alternative embodiments, the intake valve 1830 may be controlled by a camless system (not shown), such as an electrohydraulic system, as is well known in the art.

As shown in FIG. 19, the intake valve 1830 may begin to open at about 360° crank angle, that is, when the crankshaft 1812 is at or near a top dead center position of an intake stroke 1906. The closing of the intake valve 1830 may be selectively varied from about 540° crank angle, that is, when the crankshaft 1812 is at or near a bottom dead center position of a compression stroke 1907, to about 650° crank angle, that is, about 70° before top center of the combustion stroke. Thus, the intake valve 1830 may be held open for a majority portion of the compression stroke 1907, that is, for the first half of the compression stroke 1907 and a portion of the second half of the compression stroke 1907.

A controller 1850, e.g., an electronic control module (ECM), may be electrically connected to the variable intake valve closing mechanism 1848. Preferably, the controller 1850 is configured to control operation of the variable intake valve closing mechanism 1848 based on one or more engine conditions, for example, engine speed, load, pressure, and/or temperature in order to achieve a desired engine performance. It should be appreciated that the functions of the controller 1850 may be performed by a single controller or by a plurality of controllers.

Referring back to FIG. 1, it is noted that, under some operating conditions such as engine start-up and light load operation, it may be desired to operate the engine 102 using a spark ignition system (not shown), as is well known in the art.

INDUSTRIAL APPLICABILITY

As an example of an application of the present invention, reference is made to FIG. 20 in which a flow diagram illustrating a method for operating a compression ignition engine 102 having a cylinder wall 120, a piston 130, and a head 122 defining a combustion chamber 138 is shown.

In a first control block 2002, fuel is delivered to the combustion chamber 138 so that the fuel is dispersed substantially uniformly throughout the combustion chamber 138 and is spaced from the cylinder wall 120. More particularly, the fuel is dispersed throughout the combustion chamber 138 to provide a substantially homogeneous distribution, yet the fuel dispersion is controlled such that fuel does not impinge on the cylinder wall 120, which would result in fuel condensation and subsequent degradation of the lubricating oil in the engine 102.

In a second control block 2004, sufficient oxidant is delivered to the combustion chamber 138 to support combustion at a first predetermined combustion duration. Typically, the oxidant includes a supply of fresh air, as is well known in the art. However, the oxidant could be at least in part a supply of oxygen obtained from such means as use of membrane technology, as described above.

In a third control block 2006, a supply of diluent is delivered to the combustion chamber 138 sufficient to change the first predetermined combustion duration to a second predetermined combustion duration. Preferably, the second predetermined combustion duration differs from the first predetermined combustion duration. For example, the second predetermined combustion duration may be greater than the first predetermined combustion duration so that combustion is controlled over a longer period of time.

The diluent may be EGR, air, an inert gas such as nitrogen, and the like. For example, as described above, the diluent may be a gas which includes up to 40–60% EGR. As another example, the diluent may include a quantity of nitrogen obtained by means such as membrane technology, as described above. The diluent may also include a combination of gases.

In combination with the combustion duration being changed by the addition of diluent, the diluent may also serve to change a first predetermined pressure rise rate in the combustion chamber 138 to a second predetermined pressure rise rate. For example, the pressure rise rate during combustion may decrease from the addition of diluent. As described above, FIG. 7 serves to illustrate the change in both combustion duration and combustion pressure rise rate (and peak pressure) by the addition of a diluent.

Other aspects can be obtained from a study of the drawings, the disclosure, and the appended claims.

What is claimed is:

1. A homogeneous charge compression ignition engine comprising:
    a plurality of engine cylinders that each include a reciprocating piston;
    a plurality of fuel injectors that each include a tip positioned for injection of fuel directly into respective ones of the plurality of engine cylinders, and the tip having a showerhead nozzle set that includes holes oriented in a plurality of different dispersion angles corresponding to a fuel spray that disperses fuel throughout the respective engine cylinder without contact with a cylinder wall;
    means for varying a compression ratio in each of the plurality of engine cylinders;
    an exhaust gas recirculation system associated with the plurality of engine cylinders; and
    an air supply system that includes at least one turbocharger.

2. The engine of claim 1 including an electronic control unit in communication with each of the fuel injectors via a signal line; and
    means for injecting fuel in a timing range that includes a range from about 30 degrees before top dead center to about 90 degrees before top dead center.

3. The engine of claim 1 including means for delivering 40–60% exhaust gas from the exhaust gas recirculation system to the plurality of engine cylinders.

4. The engine of claim 1 including means for adjusting a combustion duration that includes means for adjusting a percentage of exhaust gas delivered to the plurality of engine cylinders.

5. The engine of claim 1 wherein the air supply system includes staged turbochargers.

* * * * *